US012804619B2

(12) United States Patent
Lei et al.

(10) Patent No.: US 12,804,619 B2
(45) Date of Patent: Nov. 17, 2026

(54) METHOD AND APPARATUS FOR MULTIPLE TRANSMISSIONS SCHEDULED BY ONE DOWNLINK CONTROL INFORMATION (DCI) FORMAT

(71) Applicant: Lenovo (Beijing) Limited, Beijing (CN)

(72) Inventors: Haipeng Lei, Beijing (CN); Yu Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 917 days.

(21) Appl. No.: 18/245,409

(22) PCT Filed: Sep. 18, 2020

(86) PCT No.: PCT/CN2020/116215

§ 371 (c)(1),
(2) Date: Mar. 15, 2023

(87) PCT Pub. No.: WO2022/056844

PCT Pub. Date: Mar. 24, 2022

(65) Prior Publication Data

US 2026/0247355 A1 Aug. 20, 2026

(51) Int. Cl.
*H04W 72/04* (2023.01)
*H04W 72/0446* (2023.01)
(Continued)

(52) U.S. Cl.
CPC ..... *H04W 72/0446* (2013.01); *H04W 72/232* (2023.01)

(58) Field of Classification Search
CPC ........................ H04W 72/0446; H04W 72/232
See application file for complete search history.

(56) References Cited

U.S. PATENT DOCUMENTS

2018/0077690 A1* 3/2018 Park ..................... H04W 72/30
2020/0029315 A1 1/2020 Lin et al.
(Continued)

FOREIGN PATENT DOCUMENTS

CN 110035508 A 7/2019
CN 110913420 A 3/2020
(Continued)

OTHER PUBLICATIONS 20953702.6 , "Extended European Search Report", Apr. 23, 2024, 11 pages.
(Continued)

*Primary Examiner* — Ronald B Abelson
(74) *Attorney, Agent, or Firm* — FIG. 1 Patents

(57) ABSTRACT

Embodiments of the present disclosure relate to methods and apparatuses for UL and DL transmissions scheduled by DCI format. According to some embodiments of the disclosure, a method for wireless communications performed by a UE may include: receiving a DCI format scheduling a first number of TBs on a second number of slots, wherein the second number of slots is consecutive in time domain without any gaps; allocating the first number of TBs on the second number of slots, wherein approximately an equal number of slots of the second number of slots is allocated to each of the first number of TBs; and transmitting the first number of TBs on the second number of slots.

20 Claims, 10 Drawing Sheets

(51) Int. Cl.
*H04W 72/23* (2023.01)
*H04W 72/232* (2023.01)

(56) References Cited

U.S. PATENT DOCUMENTS

| | | | | |
|---|---|---|---|---|
| 2020/0351934 | A1* | 11/2020 | Khoshnevisan .. | H04W 72/0446 |
| 2021/0219329 | A1* | 7/2021 | Zhou ..................... | H04L 1/1819 |
| 2021/0314983 | A1* | 10/2021 | Karaki .................. | H04W 72/23 |

FOREIGN PATENT DOCUMENTS

| | | | | |
|---|---|---|---|---|
| WO | 2019033389 | A1 | 2/2019 | |
| WO | 2020017893 | A1 | 1/2020 | |
| WO | 2020141994 | A1 | 7/2020 | |
| WO | WO 2020164147 | * | 8/2020 | ............ H04W 72/12 |
| WO | 2020227119 | A1 | 11/2020 | |

OTHER PUBLICATIONS

Nokia , et al., Feature lead summary #3 on Cross-carrier Scheduling with Different Numerologies, 3GPP Draft; R1-1907855, vol. RAN WG1, No. Reno, USA, May 17, 2019, 18 pages, May 17, 2019.

U.S. Appl. No. 18/245,409, filed Mar. 30, 2023 , “International Preliminary Report on Patentability”, U.S. Appl. No. 18/245,409, filed Mar. 30, 2023, 6 pages.

Nokia , et al., “On remaining details of HARQ procedure”, 3GPP TSG RAN WG1 Meeting 91, R1-1720480, Reno, USA [retrieved Jan. 30, 2023]. Retrieved from the Internet <https://www.3gpp.org/ftp/tsg_ran/WG1_RL1/TSGR1_91/ Docs?sortby=date>., Dec 2017, 9 Pages.

PCT/CN2020/116215 , “International Search Report and Written Opinion”, PCT Application No. PCT/CN2020/116215, Jun. 18, 2021, 7 pages.

* cited by examiner

METHOD AND APPARATUS FOR MULTIPLE TRANSMISSIONS SCHEDULED BY ONE DOWNLINK CONTROL INFORMATION (DCI) FORMAT

TECHNICAL FIELD

Embodiments of the present disclosure generally relate to wireless communication technology, and more particularly to uplink (UL) and downlink (DL) transmissions scheduled by downlink control information (DCI).

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may monitor a physical downlink control channel (PDCCH) in one or more search spaces. The PDCCH may carry downlink control information (DCI), which may schedule uplink channels, such as a physical uplink shared channel (PUSCH), or downlink channels, such as a physical downlink shared channel (PDSCH).

There is a need for handling (UL) and downlink (DL) transmissions scheduled by DCI in a wireless communication system.

SUMMARY

Some embodiments of the present disclosure provide a method for wireless communications performed by a user equipment (UE). The method may include: receiving a downlink control information (DCI) format scheduling a first number of transport blocks (TBs) on a second number of slots, wherein the second number of slots is consecutive in time domain without any gaps; allocating the first number of TBs on the second number of slots, wherein approximately an equal number of slots of the second number of slots is allocated to each of the first number of TBs; and transmitting the first number of TBs on the second number of slots.

Some embodiments of the present disclosure provide a method for wireless communications performed by a base station (BS). The method may include: transmitting a downlink control information (DCI) format scheduling a first number of transport blocks (TBs) on a second number of slots, wherein the second number of slots is consecutive in time domain without any gaps; and receiving the first number of TBs on the second number of slots, wherein approximately an equal number of slots of the second number of slots is allocated to each of the first number of TBs.

In some embodiments of the present disclosure, the difference in the number of slots allocated to each of the first number of TBs is less than or equal to one. In some embodiments of the present disclosure, the method may further include transmitting a radio resource control (RRC) signaling indicating the maximum number of TBs carried by a physical uplink shared channel (PUSCH).

In some embodiments of the present disclosure, the DCI format may indicate a first time domain resource allocation (TDRA) pattern of a plurality of TDRA patterns. In some examples, the first TDRA pattern may indicate the first number of TBs. In some other examples, the first TDRA pattern may indicate a third number of physical uplink shared channels (PUSCHs) carrying the first number of TBs scheduled by the DCI format.

In some embodiments of the present disclosure, the DCI format may indicate the first number of TBs. In some examples, the maximum number of TBs scheduled by a DCI format may be predefined. In some other examples, the method may further include transmitting a radio resource control (RRC) signaling indicating the maximum number of TBs scheduled by a DCI format.

In some embodiments of the present disclosure, the DCI format may indicate a third number of physical uplink shared channels (PUSCHs) carrying the first number of TBs scheduled by the DCI format. In some examples, the maximum number of PUSCHs scheduled by a DCI format may be predefined. In some other examples, the method may further include transmitting a radio resource control (RRC) signaling indicating the maximum number of PUSCHs scheduled by a DCI format.

In some embodiments of the present disclosure, the DCI format may indicate the value of the second number or the value of the second number minus 2. The method may further include transmitting a radio resource control (RRC) signaling indicating the maximum number of slots assigned by the DCI format. The DCI format may indicate a start symbol of a first slot of the second number of slots and the number of consecutive symbols of the last slot of the second number of slots.

In some embodiments of the present disclosure, the DCI format may indicate a first time domain resource allocation (TDRA) pattern of a plurality of TDRA patterns.

In some examples, the plurality of TDRA patterns may be predefined. In some other examples, the method may further include transmitting a radio resource control (RRC) signaling indicating the plurality of TDRA patterns.

In some embodiments of the present disclosure, the first TDRA pattern may indicate at least one start and length indicator value (SLIV) indicating a start symbol and the number of consecutive symbols in a slot, wherein each SLIV of the at least one SLIV may be associated with a physical uplink shared channel (PUSCH) carrying a TB and does not go across a slot boundary; and wherein the second number of slots may be based on the at least one SLIV.

In some embodiments of the present disclosure, the first TDRA pattern may indicate the second number of slots, and a start and length indicator value (SLIV) for indicating a start symbol of a first slot of the second number of slots and the number of consecutive symbols of the last slot of the second number of slots.

In some embodiments of the present disclosure, the first TDRA pattern may indicate the second number of slots and a start symbol of a first slot of the second number of slots.

In some embodiments of the present disclosure, the first TDRA pattern may indicate a total number of symbols in the second number of slots and a start symbol of a first slot of the second number of slots; and wherein the second number of slots is based on the total number of symbols.

In some embodiments of the present disclosure, the first TDRA pattern may indicate at least one start and length indicator value (SLIV) indicating a start symbol and the number of consecutive symbols in a slot, wherein each SLIV of the at least one SLIV may be associated with a physical uplink shared channel (PUSCH) carrying a TB and can go across a slot boundary; and wherein the second number of slots may be based on the at least one SLIV.

In some embodiments of the present disclosure, the first TDRA pattern may indicate one or more of the following: a slot level offset between the DCI format and a first slot of the second number of slots; and at least one mapping type.

In some embodiments of the present disclosure, the maximum number of TBs carried by a physical uplink shared channel (PUSCH) is one. Each of the first x TBs of the first number of TBs occupies $y_1$ slots of the second number of slots and each of the remaining N−x TBs of the first number of TBs occupies $y_2$ slots of the second number of slots, wherein x=mod(M,N), $$y_1 = \left\lceil \frac{M}{N} \right\rceil, \quad y_2 = \left\lfloor \frac{M}{N} \right\rfloor,$$

M denotes a value of the second number, and N denotes a value of the first number.

In some embodiments of the present disclosure, the maximum number of TBs carried by a physical uplink shared channel (PUSCH) is two. Each of the first x PUSCHs corresponds to $y_1$ slots, and each of the remaining N'−x PUSCHs corresponds to $y_2$ slots; wherein x=mod(M,N'), $$y_1 = \left\lceil \frac{M}{N'} \right\rceil, \quad y_2 = \left\lfloor \frac{M}{N'} \right\rfloor, \quad N' = \left\lceil \frac{N}{2} \right\rceil,$$

M denotes a value of the second number, N denotes a value of the first number, and N' denotes the number of scheduled PUSCHs.

In some embodiments of the present disclosure, each of the first x PUSCHs corresponds to $y_1$ slots, and each of the remaining N'−x PUSCHs corresponds to $y_2$ slots, and wherein x=mod(M,N'), $$y_1 = \left\lceil \frac{M}{N'} \right\rceil, \quad y_2 = \left\lfloor \frac{M}{N'} \right\rfloor,$$

M denotes a value of the second number, and N' denotes the value of the third number.

In some embodiments of the present disclosure, the DCI format may include a field indicating whether each of the first number of TBs is new data or not, and the number of bits of the field is equal to the maximum number of TBs scheduled by the DCI format.

In some embodiments of the present disclosure, the DCI format may include a field indicating a redundancy version for each of the first number of TBs, and the number of bits of the field is equal to the maximum number of TBs scheduled by the DCI format.

In some embodiments of the present disclosure, the DCI format may schedule one physical uplink shared channel (PUSCH) carrying the first number of TBs and occupying the second number of slots, and the DCI format indicates a start symbol of the PUSCH in a first slot of the second number of slots and the number of consecutive symbols of the last slot of the PUSCH in the second number of slots and the second number of slots.

Some embodiments of the present disclosure provide a method for wireless communications performed by a user equipment (UE). The method may include: receiving a downlink control information (DCI) format scheduling a first number of transport blocks (TBs) on a second number of slots, wherein the second number of slots is consecutive in time domain without any gaps; and receiving the first number of TBs on the second number of slots, wherein approximately an equal number of slots of the second number of slots is allocated to each of the first number of TBs.

Some embodiments of the present disclosure provide a method for wireless communications performed by a base station (BS). The method may include: transmitting a downlink control information (DCI) format scheduling a first number of transport blocks (TBs) on a second number of slots, wherein the second number of slots is consecutive in time domain without any gaps; allocating the first number of TBs on the second number of slots, wherein approximately an equal number of slots of the second number of slots is allocated to each of the first number of TBs; and transmitting the first number of TBs on the second number of slots.

In some embodiments of the present disclosure, the difference in the number of slots allocated to each of the first number of TBs is less than or equal to one. In some embodiments of the present disclosure, the method may further include transmitting a radio resource control (RRC) signaling indicating the maximum number of TBs carried by a physical downlink shared channel (PDSCH).

In some embodiments of the present disclosure, the DCI format may indicate a first time domain resource allocation (TDRA) pattern of a plurality of TDRA patterns. In some examples, the first TDRA pattern may indicate the first number of TBs. In some other examples, the first TDRA pattern may indicate a third number of physical downlink shared channels (PDSCHs) carrying the first number of TBs scheduled by the DCI format.

In some embodiments of the present disclosure, the DCI format may indicate the first number of TBs. In some examples, the maximum number of TBs scheduled by a DCI format may be predefined. In some other examples, the method may further include transmitting a radio resource control (RRC) signaling indicating the maximum number of TBs scheduled by a DCI format.

In some embodiments of the present disclosure, the DCI format may indicate a third number of physical downlink shared channels (PDSCHs) carrying the first number of TBs scheduled by the DCI format. In some examples, the maximum number of PDSCHs scheduled by a DCI format may be predefined. In some other examples, the method may further include transmitting a radio resource control (RRC) signaling indicating the maximum number of PDSCHs scheduled by a DCI format.

In some embodiments of the present disclosure, the DCI format may indicate the value of the second number or the value of the second number minus 2. The method may further include transmitting a radio resource control (RRC) signaling indicating the maximum number of slots assigned by the DCI format. The DCI format may indicate a start symbol of a first slot of the second number of slots and the number of consecutive symbols of the last slot of the second number of slots.

In some embodiments of the present disclosure, the DCI format may indicate a first time domain resource allocation (TDRA) pattern of a plurality of TDRA patterns.

In some examples, the plurality of TDRA patterns may be predefined. In some other examples, the method may further include transmitting a radio resource control (RRC) signaling indicating the plurality of TDRA patterns.

In some embodiments of the present disclosure, the first TDRA pattern may indicate at least one start and length indicator value (SLIV) indicating a start symbol and the number of consecutive symbols in a slot, wherein each SLIV of the at least one SLIV may be associated with a physical downlink shared channel (PDSCH) carrying a TB and does not go across a slot boundary; and wherein the second number of slots may be based on the at least one SLIV.

In some embodiments of the present disclosure, the first TDRA pattern may indicate the second number of slots, and a start and length indicator value (SLIV) for indicating a start symbol of a first slot of the second number of slots and the number of consecutive symbols of the last slot of the second number of slots.

In some embodiments of the present disclosure, the first TDRA pattern may indicate the second number of slots and a start symbol of a first slot of the second number of slots.

In some embodiments of the present disclosure, the first TDRA pattern may indicate a total number of symbols in the second number of slots and a start symbol of a first slot of the second number of slots; and wherein the second number of slots is based on the total number of symbols.

In some embodiments of the present disclosure, the first TDRA pattern may indicate at least one start and length indicator value (SLIV) indicating a start symbol and the number of consecutive symbols in a slot, wherein each SLIV of the at least one SLIV may be associated with a physical downlink shared channel (PDSCH) carrying a TB and can go across a slot boundary; and wherein the second number of slots may be based on the at least one SLIV.

In some embodiments of the present disclosure, the first TDRA pattern may indicate one or more of the following: a slot level offset between the DCI format and a first slot of the second number of slots; and at least one mapping type.

In some embodiments of the present disclosure, the maximum number of TBs carried by a physical downlink shared channel (PDSCH) is one. The method may further include determining that each of the first x TBs of the first number of TBs occupies $y_1$ slots of the second number of slots and each of the remaining N−x TBs of the first number of TBs occupies $y_2$ slots of the second number of slots, wherein x=mod(M,N), $$y_1 = \left\lceil \frac{M}{N} \right\rceil, y_2 = \left\lfloor \frac{M}{N} \right\rfloor,$$

M denotes a value of the second number, and N denotes a value of the first number.

In some embodiments of the present disclosure, wherein the maximum number of TBs carried by a physical downlink shared channel (PDSCH) is two. The method may further include determining that each of the first x PDSCHs corresponds to y slots, and each of the remaining N'−x PDSCHs corresponds to $y_2$ slots; wherein x=mod(M,N'), $$y_1 = \left\lceil \frac{M}{N'} \right\rceil, y_2 = \left\lfloor \frac{M}{N'} \right\rfloor, N' = \left\lceil \frac{N}{2} \right\rceil,$$

M denotes a value of the second number, N denotes a value of the first number, and N' denotes the number of scheduled PDSCHs.

In some embodiments of the present disclosure, the method may further include determining that each of the first x PDSCHs corresponds to $y_1$ slots, and each of the remaining N'−x PDSCHs corresponds to $y_2$ slots; wherein x=mod (M,N'), $$y_1 = \left\lceil \frac{M}{N'} \right\rceil, y_2 = \left\lfloor \frac{M}{N'} \right\rfloor,$$

M denotes a value of the second number, and N' denotes the value of the third number.

In some embodiments of the present disclosure, the DCI format may include a field indicating whether each of the first number of TBs is new data or not, and the number of bits of the field is equal to the maximum number of TBs scheduled by the DCI format.

In some embodiments of the present disclosure, the DCI format may include a field indicating a redundancy version for each of the first number of TBs, and the number of bits of the field is equal to the maximum number of TBs scheduled by the DCI format.

In some embodiments of the present disclosure, the DCI format may schedule one physical downlink shared channel (PDSCH) carrying the first number of TBs and occupying the second number of slots, and the DCI format indicates a start symbol of the PDSCH in a first slot of the second number of slots and the number of consecutive symbols of the PDSCH in the last slot of the second number of slots and the second number of slots.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
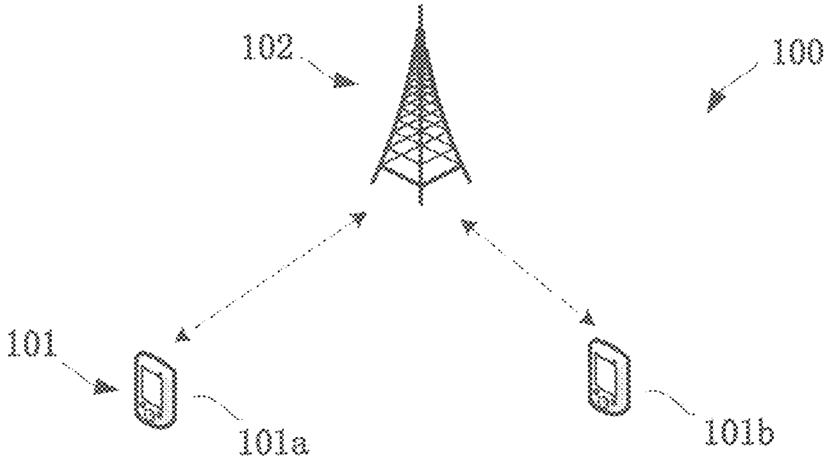
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

NR Release 17 will expand the frequency range to 71 GHz. Due to the phase noise effect at a high frequency band, higher subcarrier spacing (SCS) may be specified for the purpose of reliability. For example, 240 kHz SCS, 480 kHz SCS, 960 kHz SCS, and even 1920 kHz SCS may be considered. It is known that the higher SCS, the shorter the duration of a slot. For example, Table 1 below shows exemplary durations of a slot for different SCS. It should be understood that Table 1 is only for illustrative purposes, and should not be construed as limiting the embodiments of the present disclosure.

TABLE 1

Slot durations for different SCS

| $\mu$ | $\Delta f = 2^{\mu} \cdot 15$ [kHz] | slot duration |
|---|---|---|
| 0 | 15 | 1 ms |
| 1 | 30 | 0.5 ms |
| 2 | 60 | 0.25 ms |
| 3 | 120 | 0.125 ms |
| 4 | 240 | 0.0625 ms |

TABLE 1-continued

| Slot durations for different SCS | | |
|---|---|---|
| μ | $\Delta f = 2^{\mu} \cdot 15$ [kHz] | slot duration |
| 5 | 480 | 31.25 ns |
| 6 | 960 | 15.625 ns |

In the above Table 1, parameter μ is associated with the SCS (listed in the second column of Table 1). For example, "μ=4" may indicate a SCS of 240 kHz, and the duration of a slot for such SCS is 0.0625 ms.

As shown in above Table 1, the duration of a single slot for, for example, 480 kHz SCS or 960 kHz SCS is quite short. Considering that the processing time of a UE may not linearly increase with increased SCS, for example, a fast Fourier transform (FFT) size of 4096 and a maximum of 275 resource blocks (RBs) are still kept unchanged, and the UE has to be provided with more hybrid automatic repeat request (HARQ) processes in order to avoid new stop-and-wait progresses in time domain. In this sense, the soft buffer size at the UE has to be increased which would lead to an increased expense for the UE.

On the other hand, since the duration of a single slot is quite short, UE power consumption will become a major problem when a UE is configured to monitor physical downlink control channel (PDCCH) per slot. When a UE is configured to monitor a PDCCH in over a period of several slots, this may lead to resource waste if the current scheduling framework is maintained, for example, a single slot can schedule a single PDSCH or a single PUSCH.

In some embodiments of the present disclosure, a solution to solve the above problems is to allow a single DCI format to schedule multiple slots when a relatively high SCS is applied. For example, multi-PUSCH scheduling may be supported. That is, a single DCI format can schedule multiple PUSCHs, which can save DCI overhead and even avoid the risk of losing the channel in the case of an unlicensed spectrum. In some examples, in addition to multi-PUSCH scheduling, multi-PDSCH scheduling can also be supported. That is, a single DCI format can schedule multiple PDSCHs.

When the multi-PUSCH scheduling (or multi-PDSCHs scheduling) mechanism is applied to high SCS, if the multiple PUSCHs (or PDSCHs) scheduled by a single DCI format carry different transport blocks (TBs) (e.g., each PUSCH may carry a respective TB), a relatively high overhead may be brought about. This is because each TB may have an independent cyclic redundancy check (CRC) and independent HARQ processing flow, which, in the case of high SCS, implies an increase in the number of HARQ processes as mentioned above.

In some embodiments of the present disclosure, a solution to solve this problem is to allow the transmission of a single TB on multiple consecutive slots so that the existing maximum number of HARQ processes can be maintained.

Figure 2:
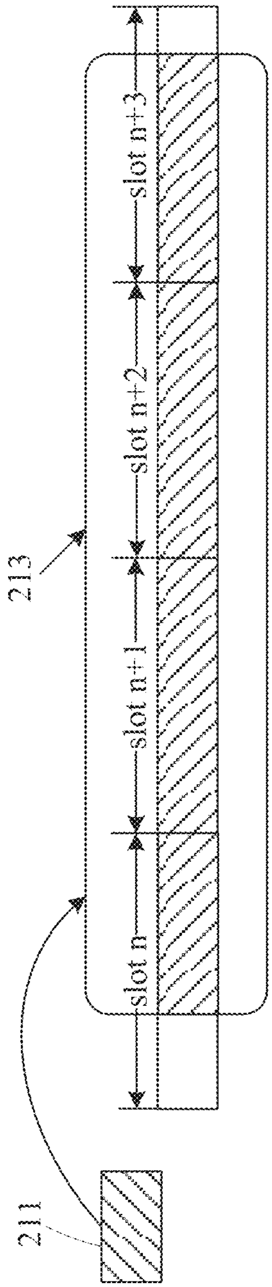
FIG. 2 illustrates a schematic diagram of a DCI format scheduling a DL or UL transmission(s) in accordance with some embodiments of the present disclosure.

FIG. 2 illustrates a schematic diagram of a DCI format scheduling a DL or UL transmission(s) in accordance with some embodiments of the present disclosure. It should be understood that FIG. 2 is only for illustrative purposes, and should not be construed as limiting the embodiments of the present disclosure.

As shown in FIG. 2, DCI format 211 may schedule TB 213 on multiple slots (e.g., slot n to slot n+3). The TB 213 may be carried on a PDSCH or a PUSCH. In some embodiments, DCI format 211 may only schedule one PDSCH or PUSCH, which carries at least TB 213. For example, the PDSCH or PUSCH may only carry TB 213. Or the PDSCH or PUSCH may carry TB 213 and another TB (not shown in FIG. 2) immediately following TB 213. In some other embodiments, DCI format 211 may schedule more than one PDSCH or PUSCH, each of which may carry at least one TB. For example, DCI format 211 may schedule two PDSCHs, the first PDSCH carries TB 213 and the second PDSCH (not shown in FIG. 2) carries another TB (not shown in FIG. 2) immediately following TB 213.

In some embodiments of the present disclosure, in the case that the maximum number of HARQ processes is not exceeded, the multiple slots scheduled by a single DCI format can be allowed to carry multiple TBs. This would bring scheduling flexibility to some extent.

Figure 3:
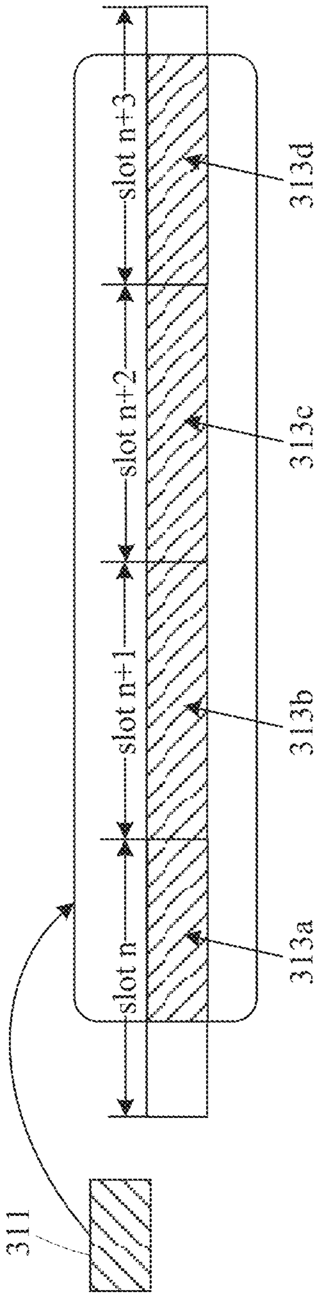
FIG. 3 illustrates a schematic diagram of a DCI format scheduling a DL or UL transmission(s) in accordance with some embodiments of the present disclosure.

FIG. 3 illustrates a schematic diagram of a DCI format scheduling a DL or UL transmission(s) in accordance with some embodiments of the present disclosure. It should be understood that FIG. 3 is only for illustrative purposes, and should not be construed as limiting the embodiments of the present disclosure.

As shown in FIG. 3, DCI format 311 may schedule multiple TBs (e.g., TB 313*a* to TB 313*d*) on multiple slots (e.g., slot n to slot n+3). For example, slot n may be allocated to TB 313*a*, slot n+1 may be allocated to TB 313*b*, slot n+2 may be allocated to TB 313*c*, and slot n+3 may be allocated to TB 313*d*.

In some embodiments, a single PDSCH or PUSCH can carry only one TB. For example, TB 313*a* to TB 313*d* may be respectively carried on PDSCH #A, PDSCH #A+1, PDSCH #A+2, and PDSCH #A+3. In some embodiments, a single PDSCH or PUSCH can carry more than one TB. For example, TB 313*a* and TB 313*b* may be carried on PDSCH #B and TB 313*c* and TB 313*d* may be carried on PDSCH #B+1.

Signaling schemes to support flexible DL and UL transmission scheduling are disclosed in the subject disclosure. For example, solutions for scheduling at least one PDSCH or PUSCH by a single DCI format that can be applied to both the licensed spectrum and the unlicensed spectrum are provided. More details on the embodiments of the present disclosure will be illustrated in the following text in combination with the appended drawings.

In some embodiments of the present disclosure, signaling scheme A is employed. Under signaling scheme A, a list of time domain resource allocation (TDRA) patterns is used to indicate the TDRA resource. Each entry of the list corresponds to a respective TDRA pattern. A DCI format may indicate an entry index of the TDRA pattern list. The DCI format may schedule a UL (e.g., PUSCH) or DL (e.g., PDSCH) transmission(s) which may carry at least one TB on at least one slot. The at least one slot assigned for the DL or UL transmission(s) is consecutive in time domain without any gaps.

In some examples, RRC signaling may be employed to configure the list of TDRA patterns. In some other examples, the list of TDRA patterns may be predefined, for example, in a standard(s). Each entry of the TDRA pattern list may indicate: (1) the number of scheduled TBs on the assigned slots for UL (e.g., PUSCH) or DL (e.g., PDSCH) transmission(s) or the number of scheduled PUSCHs or PDSCHs on the assigned slots; (2) a slot level offset between the DCI format and the first slot of the assigned slots; (3) the mapping type; (4) at least one start and length indicator value (SLIV) for the assigned slots; (5) the number of the assigned slots; (6) a start symbol of the first slot of the assigned slots; or any combination thereof. It is contemplated that other parameters besides the above parameters may also be included in the TDRA pattern list.

Among the above parameters, the mapping type may denote, for example, whether the PUSCH or PDSCH mapping starts from a slot boundary, and may include Type A and Type B. Type A may mean that the PUSCH or PDSCH starts from the slot boundary and Type B may mean that the PUSCH or PDSCH can start at any symbol. The SLIV may indicate a start symbol of a scheduled transmission in a slot and the number of consecutive symbols in the same slot or a different slot of the scheduled transmission. In some embodiments of the present disclosure, a SLIV may include a starting symbol S and an allocation length L. In some cases, the number of the assigned slots may not be indicated in the TDRA pattern list, but may be implicitly determined based on parameters such as the SLIV(s) indicated in the TDRA pattern list.

In some embodiments of the present disclosure, at least one SLIV may be applied to each of the assigned slots. The number of assigned slots is not greater than the number of SLIV fields for each entry of the TDRA list. Each SLIV field may be associated with a mapping type, which may be explicitly indicated in the TDRA list or implicitly determined and will be described later. In some examples, the symbols indicated by each SLIV field should not go across the slot boundary. In this way, each SLIV field is independent. Each SLIV field can jointly indicate the start symbol and the duration (i.e., number of symbols) in a single slot.

In these embodiments, multiple PDSCHs or PUSCHs can be allowed in a single slot. Each SLIV field may be associated with a corresponding PDSCH or PUSCH. For example, each slot may be associated with only one SLIV when a slot can include at most one PDSCH or PUSCH. In some other examples, each slot may be associated with more than one SLIV when a slot can include more than one PDSCH or PUSCH. Anyway, the number of assigned slots can be determined based on the SLIV fields. For example, the number of assigned slots can be derived from the SLIV fields included in an entry indicated by an index in a TDRA field in a DCI format.

Table 2 below shows an exemplary TDRA list according to some embodiments of the present disclosure. Each entry in Table 2 may include an entry index field, a slot level offset field, a field indicating either the number of scheduled TBs (N) or the number of scheduled PUSCHs or PDSCHs (N'), an optional mapping type field, and at least one SLIV field. The slot level offset field may indicate a slot level offset (k2) between a DCI format and the scheduled PUSCH or a slot level offset (k0) between a DCI format and the scheduled PDSCH. Each SLIV indicated in Table 2 cannot go across the slot boundary. It should be understood that Table 2 is only for illustrative purposes, and should not be construed as limiting the embodiments of the present disclosure.

TABLE 2

TDRA pattern list

| Entry index | Slot level offset | No. of scheduled TBs (or No. of scheduled PUSCHs or PDSCHs) | Mapping type (optional) | SLIV field(s) (SLIV cannot go across slot boundary) |
|---|---|---|---|---|
| . . . | . . . | . . . | . . . | . . . |
| i | $k2_i$ or $k0_i$ | $N_i$ (or $N_i'$) | . . . | SLIV 0, SLIV 1, . . . , SLIV $M_i'$-1 |
| . . . | . . . | . . . | . . . | . . . |

As shown in Table 2, entry i may include a slot level offset field indicating $k2_i$ or $k0_i$, a field indicating either the number of scheduled TBs ($N_i$) or the number of scheduled PUSCHs or PDSCHs ($N_i'$), and $M_i'$ SLIV fields indicating SLIV 0 to SLIV $M_i'-1$. The number of assigned slots can be determined based on these SLIV fields. For example, assuming that a slot can include at most one PDSCH or PUSCH and the DCI indicates a TDRA entry index of i, it is determined that the number of assigned slots is equal to $M_i'$.

In some embodiments of the present disclosure, a single SLIV field may be included in each entry. The start symbol index indicated by the single SLIV field is applied to the first slot of the assigned slots and the duration (i.e., the number of consecutive symbols) indicated by the single SLIV field is applied to the last slot of the assigned slots. The end symbol for the scheduled transmission in the first slot of the assigned slots is the last symbol of the first slot, and the start symbol for the scheduled transmission in the last slot of the assigned slots is the first symbol of the last slot. For example, assuming that there are 14 symbols in a slot (e.g., indexed as symbol 0 to symbol 13), the end symbol for the scheduled transmission in the first slot of the assigned slots is symbol 13, and the start symbol for the scheduled transmission in the last slot of the assigned slots is symbol 0. The middle slots of the assigned slots (i.e., the slots excluding the first and last slots of the assigned slots) are fully used for the DL or UL transmission. In other words, the DL or UL transmission occupies all the symbols in the middle slots.

Besides the SLIV field, each entry may include a field indicating the number of assigned slots. Based on this field, a UE or a BS can determine the number of slots assigned for the DL or UL transmissions. In these embodiments, only a single PDSCH or PUSCH can be allowed in one slot.

Table 3 below shows an exemplary TDRA list according to some embodiments of the present disclosure. Each entry in Table 3 may include an entry index field, a slot level offset field, a field indicating either the number of scheduled TBs (N) or the number of scheduled PUSCHs or PDSCHs (N'), an optional mapping type field, a field indicating the number of assigned slots (M), and a SLIV field. The slot level offset field may indicate a slot level offset (k2) between a DCI format and the scheduled PUSCH or a slot level offset (k0) between a DCI format and the scheduled PDSCH. It should be understood that Table 3 is only for illustrative purposes, and should not be construed as limiting the embodiments of the present disclosure.

TABLE 3

TDRA pattern list

| Entry index | Slot level offset | No. of scheduled TBs (or No. of scheduled PUSCHs or PDSCHs) | Mapping type (optional) | No. of assigned slots | SLIV field |
|---|---|---|---|---|---|
| . . . | . . . | . . . | . . . | . . . | . . . |
| i | $k2_i$ or $k0_i$ | $N_i$ (or $N_i'$) | . . . | $M_i$ | $SLIV_i$ |
| . . . | . . . | . . . | . . . | . . . | . . . |

As shown in Table 3, entry i may include a slot level offset field indicating $k2_i$ or $k0_i$, a field indicating either the number of scheduled TBs ($N_i$) or the number of scheduled PUSCHs or PDSCHs ($N_i'$), a field indicating the number of assigned slots ($M_i$), and a SLIV field indicating the start symbol index in the first slot of the assigned slots and the number of symbols in the last slot of the assigned slots.

In some embodiments of the present disclosure, a field indicating the start symbol index may be included in each entry. This field is applied to the first slot of the assigned slots. The end symbol for the scheduled transmission in all the assigned slots is the last symbol of the corresponding slot, and the start symbol for the scheduled transmission in the second to the last slots of the assigned slots is the first symbol of the corresponding slot. For example, assuming that there are 14 symbols in a slot (e.g., indexed as symbol 0 to symbol 13), the end symbols for the scheduled transmission in all the assigned slots are symbol 13, and the start symbol for the scheduled transmission in the second to the last slots of the assigned slots is symbol 0. Besides the above field, each entry may include a field indicating the number of assigned slots. In these embodiments, only a single PDSCH or PUSCH can be allowed in one slot.

Table 4 below shows an exemplary TDRA list according to some embodiments of the present disclosure. Each entry in Table 4 may include an entry index field, a slot level offset field, a field indicating either the number of scheduled TBs (N) or the number of scheduled PUSCHs or PDSCHs (N'), an optional mapping type field, a field indicating the number of assigned slots (M), and a start symbol field. The slot level offset field may indicate a slot level offset (k2) between a DCI format and the scheduled PUSCH or a slot level offset (k0) between a DCI format and the scheduled PDSCH. It should be understood that Table 4 is only for illustrative purposes, and should not be construed as limiting the embodiments of the present disclosure.

TABLE 4

| TDRA pattern list | | | | | |
|---|---|---|---|---|---|
| Entry index | Slot level offset | No. of scheduled TBs (or No. of scheduled PUSCHs or PDSCHs) | Mapping type (optional) | No. of assigned slots | Start symbol index |
| . . . | . . . | . . . | . . . | . . . | . . . |
| i | $k2_i$ or $k0_i$ | $N_i$ (or $N_i'$) | . . . | $M_i$ | $S_i$ |
| . . . | . . . | . . . | . . . | . . . | . . . |

As shown in Table 4, entry i may include a slot level offset field indicating $k2_i$ or $k0_i$, a field indicating either the number of scheduled TBs ($N_i$) or the number of scheduled PUSCHs or PDSCHs ($N_i'$), a field indicating the number of assigned slots ($M_i$), and a start symbol field indicating the start symbol index $S_i$ in the first slot of the assigned slots.

In some embodiments of the present disclosure, the start symbol field as described above may be included in each entry. In addition, instead of the field indicating the number of assigned slots, a field indicating the total number of assigned symbols for the current transmission may be included in each entry. The total number of symbols is counted from the start symbol indicated by the start symbol field. Based on this symbol number field, a UE or a BS can determine the number of assigned slots. In these embodiments, only a single PDSCH or PUSCH can be allowed in one slot.

Table 5 below shows an exemplary TDRA list according to some embodiments of the present disclosure. Each entry in Table 5 may include an entry index field, a slot level offset field, a field indicating either the number of scheduled TBs (N) or the number of scheduled PUSCHs or PDSCHs (N'), an optional mapping type field, a field indicating the number of assigned symbols (P), and a start symbol field. The slot level offset field may indicate a slot level offset (k2) between a DCI format and the scheduled PUSCH or a slot level offset (k0) between a DCI format and the scheduled PDSCH. It should be understood that Table 5 is only for illustrative purposes, and should not be construed as limiting the embodiments of the present disclosure.

TABLE 5

| TDRA pattern list | | | | | |
|---|---|---|---|---|---|
| Entry index | Slot level offset | No. of scheduled TBs (or No. of scheduled PUSCHs or PDSCHs) | Mapping type (optional) | No. of assigned symbols | Start symbol index |
| . . . | . . . | . . . | . . . | . . . | . . . |
| i | $k2_i$ or $k0_i$ | $N_i$ (or $N_i'$) | . . . | $P_i$ | $S_i$ |
| . . . | . . . | . . . | . . . | . . . | . . . |

As shown in Table 5, entry i may include a slot level offset field indicating $k2_i$ or $k0_i$, a field indicating either the number of scheduled TBs ($N_i$) or the number of scheduled PUSCHs or PDSCHs ($N_i'$), a field indicating the number of assigned symbols ($P_i$), and a start symbol field indicating the start symbol index $S_i$ in the first slot of the assigned slots.

In some embodiments of the present disclosure, at least one SLIV field indicating the start symbol index and the number of consecutive symbols may be included in each entry. Each SLIV field may be associated with a PDSCH or PUSCH. Different from the above embodiments described with respect to Table 2, in these embodiments, a PDSCH or PUSCH may go across the slot boundary. For example, assuming that a slot includes 14 symbols, indexed as symbol 0 to symbol 13, a SLIV may be configured as starting from symbol 7 and having a duration of 21 symbols, which means that the corresponding PDSCH or PUSCH occupies one and a half slots.

In these embodiments, the number of SLIV fields in each entry is equal to the number of PDSCHs or PUSCHs scheduled by the corresponding DCI format. In these embodiments, only a single PDSCH or PUSCH can be allowed in one slot. In this way, each SLIV field is independent. In other words, each SLIV field can jointly indicate the start symbol and the duration (i.e., number of symbols) in at least one slot. In these embodiments, the number of bits of a SLIV field (i.e., the bits required for indicating a SLIV) may be more than 7 bits.

Table 6 below shows an exemplary TDRA list according to some embodiments of the present disclosure. Each entry in Table 6 may include an entry index field, a slot level offset field, a field indicating either the number of scheduled TBs (N) or the number of scheduled PUSCHs or PDSCHs (N'), an optional mapping type field, and at least one SLIV field. The slot level offset field may indicate a slot level offset (k2) between a DCI format and the scheduled PUSCH or a slot level offset (k0) between a DCI format and the scheduled PDSCH. The SLIV indicated in Table 6 can go across the slot boundary. It should be understood that Table 6 is only for illustrative purposes, and should not be construed as limiting the embodiments of the present disclosure.

TABLE 6

| TDRA pattern list | | | | |
|---|---|---|---|---|
| Entry index | Slot level offset | No. of scheduled TBs (or No. of scheduled PUSCHs or PDSCHs) | Mapping type (optional) | SLIV field(s) (SLIV may go across slot boundary) |
| . . . | . . . | . . . | . . . | . . . |
| i | $k2_i$ or $k0_i$ | $N_i$ (or $N_i'$) | . . . | SLIV 0, SLIV 1, . . . , SLIV $N_i'$-1 |
| . . . | . . . | . . . | . . . | . . . |

As shown in Table 2, entry i may include a slot level offset field indicating $k2_i$ or $k0_i$, a field indicating either the number of scheduled TBs ($N_i$) or the number of scheduled PUSCHs or PDSCHs ($N_i'$), and $N_i'$ SLIV fields indicating SLIV 0 to SLIV $N_i'-1$.

Another issue is how to map the scheduled TBs (or PUSCHs or PDSCHs) onto the assigned slots. That is, A UE or BS may need to establish the mapping relationship between scheduled TBs (or PUSCHs or PDSCHs) and the number of assigned slots. For example, a TB may occupy one or more slots in time domain. The principle is to ensure that approximately an equal number of slots is occupied by each TB. For example, any TB may occupy the same or at most one more slot compared to any other TB(s). In other words, the difference in the number of slots allocated to each of the scheduled TBs is less than or equal to one, i.e., the difference in the number of slots allocated to each of the scheduled TBs is equal to 0 or 1.

The number of TBs carried by a PUSCH or PDSCH may be at least one. In some embodiments of the present disclosure, RRC signaling may be employed to indicate the maximum number of TBs carried by a PUSCH or PDSCH. For example, the maximum number of TBs carried by a PUSCH or PDSCH may be one, two, or other positive integers. If each PUSCH or PDSCH is configured to transmit up to one TB (i.e., the maximum number of TBs carried by a PUSCH or PDSCH is one), then every TB is transmitted in a respective one PUSCH or PDSCH. If each PUSCH or PDSCH is configured to transmit up to 2 TBs (i.e., the maximum number of TBs carried by a PUSCH or PDSCH is two), then every two TBs may be transmitted in a respective PUSCH or PDSCH. In the case that the number of scheduled TBs is indicated in the TDRA pattern list, a UE can determine the number of scheduled PUSCHs or PDSCHs based on the number of scheduled TBs and the maximum number of TBs and vice versa.

Examples of the mapping between the scheduled TBs (or PUSCHs or PDSCHs) and the assigned slots are described in detail below.

In some embodiments of the present disclosure, in the case that the number of TBs (e.g., N) is indicated in the TDRA pattern list and each PUSCH or PDSCH can carry only one TB (i.e., the maximum number of TBs carried by a PUSCH or PDSCH is one and may be configured via an RRC signaling message), within the N scheduled TBs, each of the first x TBs of the N scheduled TBs may occupy $y_1$ slots of M assigned slots and each of the remaining N−x TBs of the N scheduled TBs may occupy $y_2$ slots of the M assigned slots, wherein x=mod(M,N), $$y_1 = \left\lceil \frac{M}{N} \right\rceil, \; y_2 = \left\lfloor \frac{M}{N} \right\rfloor,$$

M denotes the number of assigned slots, and N denotes the number of scheduled TBs. As mentioned above, M is either indicated in the TDRA pattern list or can be determined therefrom (i.e., implicitly indicated therein). In this way, the principle that approximately an equal number of slots is occupied by each TB can be ensured.

Figure 4:
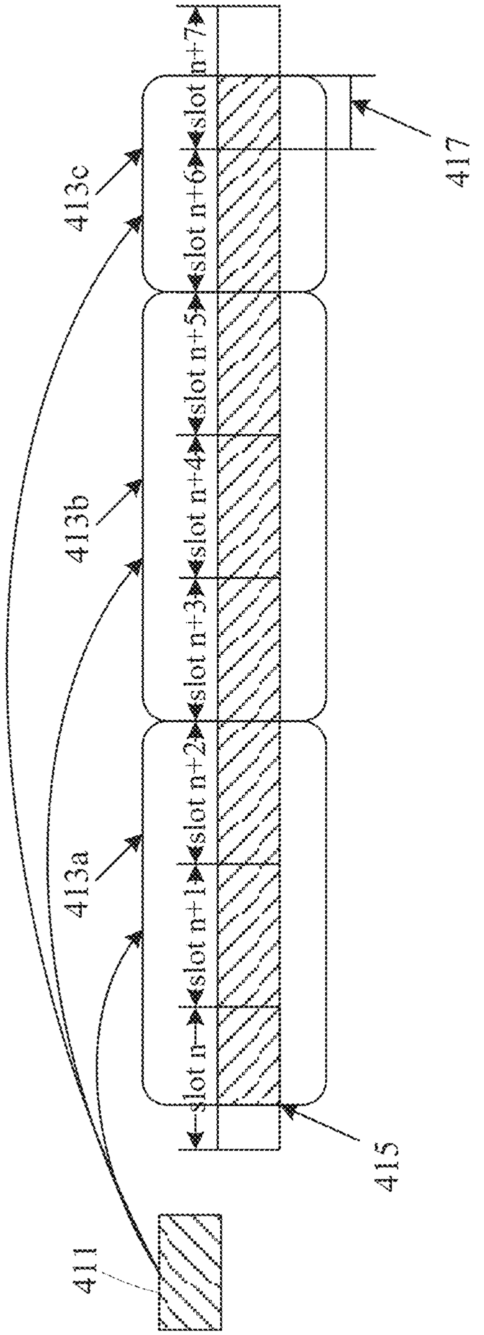
FIG. 4 illustrates a schematic diagram of a DCI format scheduling a DL or UL transmission(s) in accordance with some embodiments of the present disclosure.

FIG. 4 illustrates a schematic diagram of a DCI format scheduling a DL or UL transmission(s) in accordance with some embodiments of the present disclosure. It should be understood that FIG. 4 is only for illustrative purposes, and should not be construed as limiting the embodiments of the present disclosure.

As shown in FIG. 4, DCI format 411 may schedule multiple TBs (e.g., TB 413*a* to TB 413*c*) on multiple slots (e.g., slot n to slot n+7). DCI format 411 may indicate a specific entry in the TDRA pattern list. The specific entry may indicate the number of assigned slots being 8, and the number of scheduled TBs being 3. Therefore, in the example of FIG. 4, M=8, N=3. In the case that the maximum number of TBs carried by a PUSCH or PDSCH is one, according to the above method, x=mod(M,N)=2, $$y_1 = \left\lceil \frac{M}{N} \right\rceil = 3, \text{ and } y_2 = \left\lfloor \frac{M}{N} \right\rfloor = 2.$$

Therefore, each of the first two TBs occupies 3 slots (e.g., TB 413*a* occupies slots n to n+2 and TB 413*b* occupies slots n+3 to n+5) and the last TB occupies the remaining 2 slots (e.g., TB 413*c* occupies slots n+6 to n+7).

In some embodiments of the present disclosure, in the case that the number of TBs (e.g., N) is indicated in the TDRA pattern list and each PUSCH or PDSCH can carry at most two TBs (i.e., the maximum number of TBs carried by a PUSCH or PDSCH is two and may be configured via an RRC signaling message), the number of scheduled PUSCHs or PDSCHs is $$N' = \left\lceil \frac{N}{2} \right\rceil.$$

If N mod 2=0, then every two consecutive TBs are carried in a respective one PUSCH or PDSCH; otherwise, every two consecutive TBs are carried by each of the first N'−1 scheduled PUSCHs or PDSCHs and the last TB is carried by the last scheduled PUSCH or PDSCH. One scheduled PUSCH or PDSCH can occupy at least one slot in time domain.

Within the N' scheduled PUSCHs or PDSCHs, each of the first x PUSCHs or PDSCHs corresponds to $y_1$ slots, and each of the remaining N'−x PUSCHs or PDSCHs corresponds to $y_2$ slots, wherein x=mod(M,N'), $$y_1 = \left\lceil \frac{M}{N'} \right\rceil, \; y_2 = \left\lfloor \frac{M}{N'} \right\rfloor, \; N' = \left\lceil \frac{N}{2} \right\rceil,$$

M denotes the number of assigned slots, N denotes the number of scheduled TBs, and N' denotes the number of scheduled PUSCHs or PDSCHs. As mentioned above, M is either indicated in the TDRA pattern list or can be determined therefrom. In this way, the principle that approximately an equal number of slots is occupied by each TB can be ensured.

Figure 5:
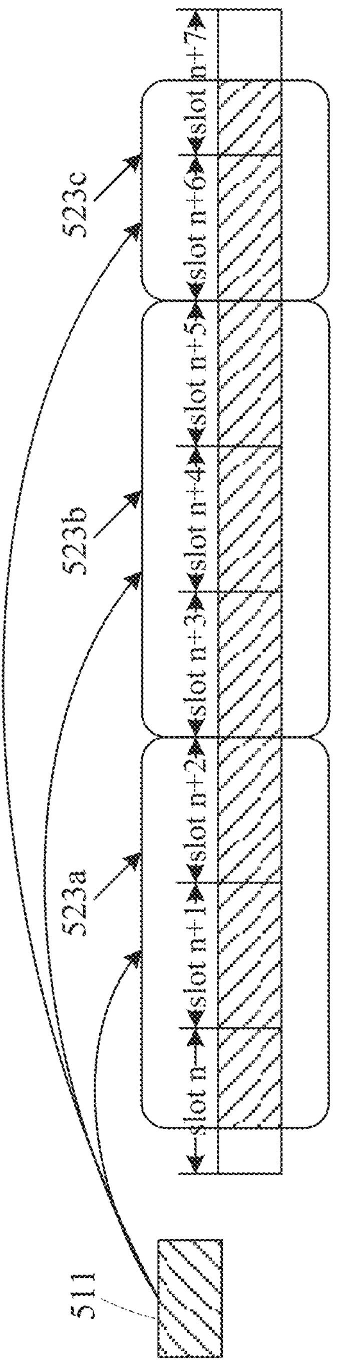
FIG. 5 illustrates a schematic diagram of a DCI format scheduling a DL or UL transmission(s) in accordance with some embodiments of the present disclosure.

FIG. 5 illustrates a schematic diagram of a DCI format scheduling a DL or UL transmission(s) in accordance with some embodiments of the present disclosure. It should be understood that FIG. 5 is only for illustrative purposes, and should not be construed as limiting the embodiments of the present disclosure.

As shown in FIG. 5, DCI format 511 may schedule multiple TBs on multiple slots (e.g., slot n to slot n+7). DCI format 511 may indicate a specific entry in the TDRA pattern list.

In some embodiments of the present disclosure, the specific entry may indicate the number of assigned slots being 8, and the number of scheduled TBs being 3. In other words, M=8, N=5. In the case that the maximum number of TBs carried by a PUSCH or PDSCH is one, according to the above method, $$N' = \left\lceil \frac{N}{2} \right\rceil = 3,$$

x=mod(M,N')=2, $$y_1 = \left\lceil \frac{M}{N'} \right\rceil = 3,\ y_2 = \left\lfloor \frac{M}{N'} \right\rfloor = 2.$$

Therefore, each of the first two PUSCHs or PDSCHs occupies 3 slots (e.g., PUSCH or PDSCH 523*a* occupies slots n to n+2 and PUSCH or PDSCH 523*b* occupies slots n+3 to n+5) and the last PUSCH or PDSCH occupies the remaining 2 slots (e.g., PUSCH or PDSCH 523*c* occupies slots n+6 to n+7). Each of PUSCHs or PDSCHs 523*a* and 523*b* carries two TBs and PUSCH or PDSCH 523*c* carry one TB. Approximately an equal number of slots per TB is ensured.

In some embodiments of the present disclosure, the number of PUSCHs or PDSCHs (e.g., N') may be indicated in the TDRA pattern list. Each PUSCH or PDSCH can carry at most one or more TBs (i.e., the maximum number of TBs carried by a PUSCH or PDSCH is one, two, or other positive integers and may be configured via an RRC signaling message). One scheduled PUSCH or PDSCH can occupy at least one slot in time domain. Within the N' scheduled PUSCHs or PDSCHs, each of the first x PUSCHs or PDSCHs corresponds to $y_1$ slots, and each of the remaining N'−x PUSCHs or PDSCHs corresponds to $y_2$ slots, wherein x=mod(M,N'), $$y_1 = \left\lceil \frac{M}{N'} \right\rceil,\ y_2 = \left\lfloor \frac{M}{N'} \right\rfloor,$$

M denotes the number of assigned slots, and N' denotes the number of scheduled PUSCHs or PDSCHs. As mentioned above, M is either indicated in the TDRA pattern list or can be determined therefrom.

Referring back to FIG. 5, in some embodiments of the present disclosure, the specific entry indicated by DCI formation 511 may indicate the number of assigned slots being 8, and the number of scheduled PUSCHs or PDSCHs being 3. In other words, M=8, N'=3. According to the above method, x=mod(M, N')=2, $$y_1 = \left\lceil \frac{M}{N'} \right\rceil = 3,\ y_2 = \left\lfloor \frac{M}{N'} \right\rfloor = 2.$$

Therefore, each of the first two PUSCHs or PDSCHs occupies 3 slots (e.g., PUSCH or PDSCH 523*a* occupies slots n to n+2 and PUSCH or PDSCH 523*b* occupies slots n+3 to n+5) and the last PUSCH or PDSCH occupies the remaining 2 slots (e.g., PUSCH or PDSCH 523*c* occupies slots n+6 to n+7). Approximately an equal number of slots per TB is ensured. In these embodiments, the maximum number of TBs carried by the PUSCHs or PDSCHs can be one, two, or other positive integers and may be configured via an RRC signaling message.

In some embodiments of the present disclosure, all of the assigned slots may carry a single TB. That is, one TB occupies all of the assigned slots. In some embodiments of the present disclosure, each of the assigned slots may carry a respective one TB. In these embodiments, each TDRA pattern (e.g., each entry) may further include a one-bit field indicating one of the above mapping methods (e.g., either one TB occupying all assigned slots or a one to one TB to slot mapping). In this way, the TB to slot mapping is quite simple.

As mentioned above, a mapping type may be optionally included in the TDRA list. In some embodiments of the present disclosure, in each entry of the TDRA list, each SLIV field may have an associated mapping type field. The number of SLIV fields may be equal to the number of mapping type fields. In this way, each SLIV field is independent. For example, referring to Table 2, each of the SLIV fields SLIV 0, SLIV 1, . . . , SLIV $M_i$'−1 may have an associated mapping type. That is, each entry may include $M_i$ mapping type fields. Similarly, referring to Table 6, each of the SLIV fields SLIV 0, SLIV 1, . . . , SLIV $N_i$'−1 may have an associated mapping type. That is, each entry may include $N_i$' mapping type fields.

In some embodiments of the present disclosure, mapping type A is applied to all of the assigned slots. This is because the slot duration is sufficiently short due to the high SCS, and thus PUSCH or PDSCH mapping type B is not considered. In these embodiments, each entry of the TDRA list does not include a mapping type field.

In some embodiments of the present disclosure, mapping type B is applied to the first slot of the assigned slots in order to provide scheduling flexibility and mapping type A is applied to the remaining slots of the assigned slots. In these embodiments, each entry of the TDRA list also does not need to include a mapping type field.

In some embodiments of the present disclosure, a single mapping type is included in each entry and used to indicate the mapping type for the first slot of the assigned slots in order to provide scheduling flexibility. Mapping type A is applied to the remaining slots of the assigned slots. For example, referring to Tables 2-6, entry i may include a mapping type field indicating the mapping type for the first slot of the assigned slots.

In some embodiments of the present disclosure, signaling scheme B is employed. Under signaling scheme B, some of the parameters listed in the TDRA list as described with respect to signaling scheme A may be indicated in the DCI format.

In some embodiments of the present disclosure, the maximum number of TBs which can be scheduled by a single DCI format may be configured by RRC signaling or predefined, for example, in a standard(s). The DCI format may include a new field to indicate the number of TBs actually scheduled by the DCI format. Assuming that the maximum number of TBs allowed to be scheduled by a single DCI format is X, the DCI format may include $\lceil \log_2(X) \rceil$ bits for indicating the number of actually scheduled TBs.

In some other embodiments of the present disclosure, the maximum number of PUSCHs or PDSCHs which can be scheduled by a single DCI format may be configured by RRC signaling or predefined, for example, in a standard(s). The DCI format may include a new field to indicate the number of PUSCHs for a UL transmission or PDSCHs for DL transmission actually scheduled by the DCI format. Assuming that the maximum number of PUSCHs or PDSCHs allowed to be scheduled by a single DCI format is Z, the DCI format may include $\lceil \log_2(Z) \rceil$ bits for indicating the number of actually scheduled PUSCHs or PDSCHs.

In some embodiments of the present disclosure, the maximum number of slots which can be assigned by a single DCI format may be configured by RRC signaling or predefined, for example, in a standard(s). In some examples, the DCI format may include a new field to indicate the number of slots actually assigned by the DCI format. In some other examples, the DCI format may include a new field to indicate the number of middle slots of the actually assigned slots. Middle slots refer to the assigned slots excluding the first and last assigned slots. That is, assuming that the number of assigned slots is M, the number of middle slots is M−2. Assuming that the maximum number of slots allowed to be assigned by a single DCI format is Y, the DCI format may include $\lceil \log_2(Y) \rceil$ bits for indicating the number of actually assigned slots. In the above embodiments, the DCI format may further include a TDRA field, which may indicate a start symbol of a first slot of the assigned slots and the number of consecutive symbols of the last slot of the assigned slots.

In some embodiments of the present disclosure, instead of directly indicating the number of slots in a DCI format, the DCI format may indicate an entry index of a TDRA pattern list. Each entry of the TDRA pattern list may explicitly or implicitly indicate the number of slots. The TDRA pattern list under signaling scheme B may be similar to those as described above (e.g., Tables 2-6) with respect to signaling scheme A, except that the TDRA pattern list under signaling scheme B does not include the field indicating either the number of scheduled TBs or the number of scheduled PUSCHs or PDSCHs because such information is already indicated in the DCI format.

After determining the number of scheduled TBs (or PUSCHs or PDSCHs) and the number of assigned slots, a UE or BS may need to establish the mapping relationship between scheduled TBs (or PUSCHs or PDSCHs) and the number of assigned slots. The same mapping methods described above with respect to signaling scheme A can also be applied to signaling scheme B.

For instance, in some examples, assuming that the DCI format indicates N scheduled TBs and M assigned slots (or the number of assigned slots is explicitly or implicitly indicated in a TDRA pattern list) and each PUSCH or PDSCH can carry only one TB, within the N scheduled TBs, each of the first x TBs of the N scheduled TBs may occupy $y_1$ slots of M assigned slots and each of the remaining N−x TBs of the N scheduled TBs may occupy $y_2$ slots of the M assigned slots, wherein x=mod(M,N), $$y_1 = \left\lceil \frac{M}{N} \right\rceil,\ y_2 = \left\lfloor \frac{M}{N} \right\rfloor.$$

In some other examples, assuming that the DCI format indicates N scheduled TBs and M assigned slots (or the number of assigned slots is explicitly or implicitly indicated in a TDRA pattern list) and each PUSCH or PDSCH can carry at most two TBs, within N' scheduled PUSCHs or PDSCHs, each of the first x PUSCHs or PDSCHs corresponds to $y_1$ slots, and each of the remaining N'−x PUSCHs or PDSCHs corresponds to $y_2$ slots, wherein x=mod(M,N'), $$y_1 = \left\lceil \frac{M}{N'} \right\rceil,\ y_2 = \left\lfloor \frac{M}{N'} \right\rfloor,\ N' = \left\lceil \frac{N}{2} \right\rceil,$$

and N' denotes the number of scheduled PUSCHs or PDSCHs.

In yet other examples, assuming that the DCI format indicates N' scheduled PUSCHs or PDSCHs and M assigned slots (or the number of assigned slots is explicitly or implicitly indicated in a TDRA pattern list) and each PUSCH or PDSCH can carry at most one or more TBs, within the N' scheduled PUSCHs or PDSCHs, each of the first x PUSCHs or PDSCHs corresponds to $y_1$ slots, and each of the remaining N'−x PUSCHs or PDSCHs corresponds to $y_2$ slots, wherein x=mod(M,N'), $$y_1 = \left\lceil \frac{M}{N'} \right\rceil,\text{ and } y_2 = \left\lfloor \frac{M}{N'} \right\rfloor.$$

In yet other examples, each entry of the TDRA pattern list may include a one-bit field indicating either one TB occupying all assigned slots or a one to one TB to slot mapping.

In both signaling scheme A and signaling scheme B, the DCI format may include a new data indicator (NDI) field indicating whether each of the scheduled TBs is new data or not, and the number of bits of the NDI field is equal to the maximum number of TBs scheduled by the DCI format. The DCI format may also include a RV field indicating a redundancy version for each of the scheduled TBs, and the number of bits of the RV field is equal to the maximum number of TBs scheduled by the DCI format. An RV field may include one bit. In some examples, the value of "0" of the RV field may indicate RV0 of the scheduled TBs (i.e., the repetition with the most systematic bits) and bit "1" of the RV field may indicate another RV (e.g., RV2) of the scheduled TBs. In some other examples, the value of "1" of the RV field may indicate RV0 and bit "0" of the RV field may indicate another RV (e.g., RV2).

In some embodiments of the present disclosure, a DCI format may schedule a single PUSCH or PDSCH occupying at least one slot. The DCI format may indicate a start symbol of the scheduled PUSCH or PDSCH in a first slot of the assigned slots and the number of consecutive symbols of the scheduled PUSCH or PDSCH in the last slot of the assigned slots. The DCI format may also indicate the number of the assigned slots.

Figure 6:
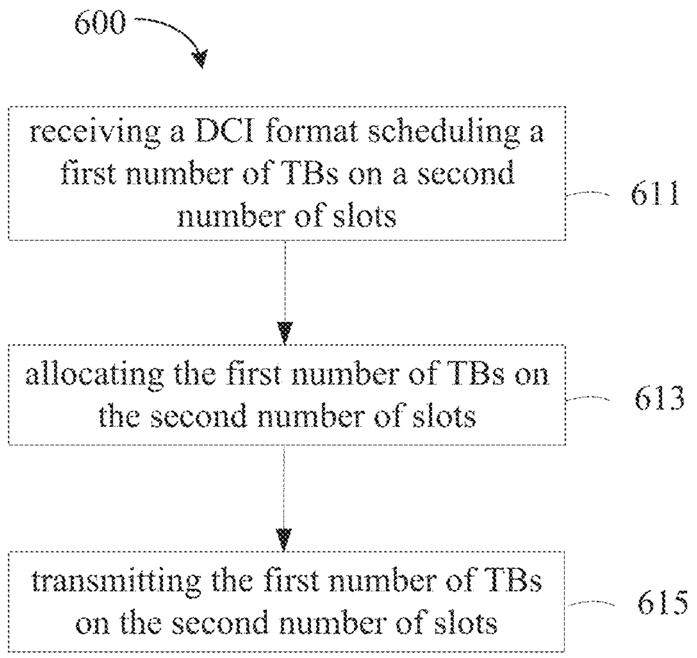
FIG. 6 illustrates a flow chart of an exemplary procedure of wireless communications in accordance with some embodiments of the present disclosure.

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. The procedure may be performed by a UE, for example, UE 101 in FIG. 1.

Referring to FIG. 6, in operation 611, a UE may receive a DCI format scheduling a first number of TBs on a second number of slots from a BS. The second number of slots is consecutive in time domain without any gaps. The DCI format may schedule at least one PUSCH for carrying the first number of TBs. In some embodiments of the present disclosure, the UE may receive a RRC signaling message indicating the maximum number of TBs carried by a PUSCH. For example, the maximum number of TBs carried by a PUSCH may be one, two, or other positive integers.

In operation 613, the UE may allocate the first number of TBs on the second number of slots. The UE may allocate the TBs according to the method as described with respect to signaling scheme A and signaling scheme B. As a principle, approximately an equal number of slots of the second number of slots is allocated to each of the first number of TBs. For example, the difference in the number of slots allocated to each of the first number of TBs may be less than or equal to a certain number, for example, one.

In some embodiments of the present disclosure, signaling scheme A is applied to the exemplary procedure 600. For example, the DCI format may indicate a specific TDRA pattern (hereinafter, "first TDRA pattern") of a plurality of TDRA patterns. In some embodiments, the first TDRA pattern may indicate the first number of TBs. In some other embodiments, the first TDRA pattern may indicate a third number of PUSCHs carrying the first number of TBs scheduled by the DCI format. The plurality of TDRA patterns may be configured by a RRC signaling message or predefined. The TDRA pattern list as described above with respect to signaling scheme A may apply here as the plurality of TDRA patterns.

In some embodiments of the present disclosure, signaling scheme B is applied to the exemplary procedure 600. For example, the DCI format may indicate the first number of TBs. The maximum number of TBs scheduled by a DCI format may be configured by a RRC signaling message or predefined. In some other examples, the DCI format may indicate a third number of PUSCHs carrying the first number of TBs scheduled by the DCI format. The maximum number of PUSCHs scheduled by a DCI format may be configured by a RRC signaling message or predefined.

In some embodiments, the DCI format may further indicate the value of the second number or the value of the second number minus 2 (e.g., the number of middle slots). The maximum number of slots assigned by the DCI format may be configured by a RRC signaling message. The DCI format may further indicate a start symbol of a first slot of the second number of slots and the number of consecutive symbols of the last slot of the second number of slots.

In some other embodiments, the DCI format indicates a specific TDRA pattern (hereinafter, "first TDRA pattern") of a plurality of TDRA patterns. The plurality of TDRA patterns may be configured by a RRC signaling message or predefined. The TDRA pattern list as described above with respect to signaling scheme B may apply here as the plurality of TDRA patterns.

For example, in both signaling scheme A and signaling scheme B, the first TDRA pattern may indicate at least one SLIV indicating a start symbol and the number of consecutive symbols in a slot, wherein each SLIV of the at least one SLIV is associated with a PUSCH carrying a TB and does not go across a slot boundary. The second number of slots may be based on the at least one SLIV.

In some other examples, in both signaling scheme A and signaling scheme B, the first TDRA pattern may indicate the second number of slots, and a SLIV for indicating a start symbol of a first slot of the second number of slots and the number of consecutive symbols of the last slot of the second number of slots. In these examples, the end symbol for the scheduled transmission in the first slot of the second number of slots is the last symbol of the first slot, and the start symbol for the scheduled transmission in the last slot of the assigned slots is the first symbol of the last slot. The middle slots of the second number of slots (i.e., the slots excluding the first and last slots) are fully used. For example, referring to FIG. 4, the SLIV may indicate a start symbol 415 index of slot n and the number of consecutive symbols 417 in slot n+7.

In yet other examples, in both signaling scheme A and signaling scheme B, the first TDRA pattern may indicate the second number of slots and a start symbol of a first slot of the second number of slots. The start symbol is applied to the first slot of the second number of slots. That is, the scheduled transmission in the first slot of the second number of slots starts from the indicated start symbol. The end symbol for the scheduled transmission in all the second number of slots is the last symbol (e.g., symbol 13) of the corresponding slot, and the start symbol for the scheduled transmission in the second to the last slots of the second number of slots is the first symbol (e.g., symbol 0) of the corresponding slot.

In yet other examples, in both signaling scheme A and signaling scheme B, the first TDRA pattern may indicate a total number of symbols in the second number of slots and a start symbol of a first slot of the second number of slots. The start symbol is applied to the first slot of the second number of slots. That is, the scheduled transmission in the first slot of the second number of slots starts from the indicated start symbol. The end symbol for the scheduled transmission in all the second number of slots is the last symbol of the corresponding slot (e.g., symbol 13), and the start symbol for the scheduled transmission in the second to the last slots of the second number of slots is the first symbol of the corresponding slot (e.g., symbol 0). The second number of slots may be based on the total number of symbols. For example, the total number of symbols may be counted from the indicated start symbol.

In yet other examples, in both signaling scheme A and signaling scheme B, the first TDRA pattern may indicate at least one SLIV indicating a start symbol and the number of consecutive symbols in a slot. Each SLIV of the at least one SLIV may be associated with a PUSCH carrying a TB and can go across a slot boundary. The second number of slots may be based on the at least one SLIV.

In both signaling scheme A and signaling scheme B, the first TDRA pattern may indicate one or more of the following: a slot level offset between the DCI format and a first slot of the second number of slots (or a first PUSCH); and at least one mapping type. The descriptions of the mapping type described above may apply here.

The UE may then establish the mapping relationship between scheduled TBs (or PUSCHs) and the number of assigned slots according to the mapping methods described above with respect to signaling scheme A and signaling scheme B.

For example, when the first TDRA pattern or the DCI format indicates the number of TBs and the maximum number of TBs carried by a PUSCH is one (e.g., configured by a RRC signaling message), the UE may determine that each of the first x TBs of the first number of TBs occupies $y_1$ slots of the second number of slots and each of the remaining N−x TBs of the first number of TBs occupies $y_2$ slots of the second number of slots, wherein x=mod(M,N), $$y_1 = \left\lceil \frac{M}{N} \right\rceil,\ y_2 = \left\lfloor \frac{M}{N} \right\rfloor,$$

M denotes a value of the second number, and N denotes a value of the first number.

In some other examples, when the first TDRA pattern or the DCI format indicates the number of TBs and the maximum number of TBs carried by a PUSCH is two (e.g., configured by a RRC signaling message), the UE may determine that each of the first x PUSCHs corresponds to $y_1$ slots, and each of the remaining N'−x PUSCHs corresponds to $y_2$ slots, wherein x=mod(M,N'), $$y_1 = \left\lceil \frac{M}{N'} \right\rceil,\ y_2 = \left\lfloor \frac{M}{N'} \right\rfloor,\ N' = \left\lceil \frac{N}{2} \right\rceil,$$

M denotes a value of the second number, N denotes a value of the first number, and N' denotes the number of scheduled PUSCHs.

In yet other examples, when the first TDRA pattern or the DCI format indicates the number of scheduled PUSCHs, the UE may determine that each of the first x PUSCHs corresponds to $y_1$ slots, and each of the remaining N'−x PUSCHs corresponds to $y_2$ slots, wherein x=mod(M,N'), $$y_1 = \left\lceil \frac{M}{N'} \right\rceil,\ y_2 = \left\lfloor \frac{M}{N'} \right\rfloor,$$

M denotes a value of the second number, and N' denotes a value of the third number.

In yet other examples, each entry of the TDRA pattern list may include a one-bit field indicating either one TB occupying all assigned slots or a one to one TB to slot mapping.

In some embodiments of the present disclosure, the DCI format may include a field indicating whether each of the first number of TBs is new data or not, and the number of the bits of the field is equal to the maximum number of TBs scheduled by the DCI format.

In some embodiments of the present disclosure, the DCI format may include a field indicating a redundancy version for each of the first number of TBs, and the number of the bits of the field is equal to the maximum number of TBs scheduled by the DCI format.

In some embodiments of the present disclosure, the DCI format may only schedule one PUSCH carrying the first number of TBs and occupying the second number of slots. The DCI format may indicate a start symbol of the PUSCH in a first slot of the second number of slots and the number of consecutive symbols of the PUSCH in the last slot of the second number of slots and the second number of slots.

In operation 615, the UE may transmit the first number of TBs on the second number of slots to the BS.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
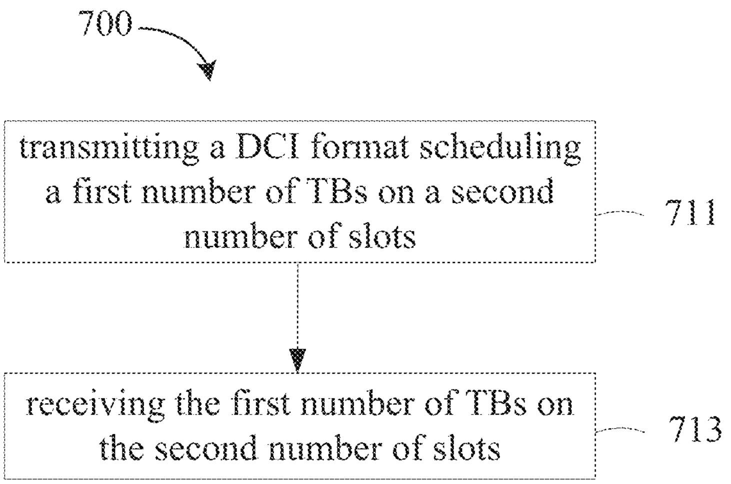
FIG. 7 illustrates a flow chart of an exemplary procedure of wireless communications in accordance with some embodiments of the present disclosure.

FIG. 7 illustrates a flow chart of an exemplary procedure 700 for wireless communications in accordance with some embodiments of the present disclosure. Details described in all of the foregoing embodiments of the present disclosure are applicable for the embodiments shown in FIG. 7. The procedure may be performed by a BS, for example, BS 102 in FIG. 1.

Referring to FIG. 7, in operation 711, a BS may transmit a DCI format scheduling a first number of TBs on a second number of slots to a UE. The second number of slots is consecutive in time domain without any gaps. The DCI format may schedule at least one PUSCH for carrying the first number of TBs. In some embodiments of the present disclosure, the BS may transmit a RRC signaling message indicating the maximum number of TBs carried by a PUSCH. For example, the maximum number of TBs carried by a PUSCH may be one, two, or other positive integers. In operation 713, the BS may receive the first number of TBs on the second number of slots.

Signaling scheme A or signaling scheme B may be applied to the exemplary procedure 700. As a principle, approximately an equal number of slots of the second number of slots is allocated to each of the first number of TBs. For example, the difference in the number of slots allocated to each of the first number of TBs may be less than or equal to a certain number, for example, one.

In some embodiments of the present disclosure, signaling scheme A is applied to the exemplary procedure 700.

For example, the DCI format may indicate a specific TDRA pattern (hereinafter, "first TDRA pattern") of a plurality of TDRA patterns. In some embodiments, the first TDRA pattern may indicate the first number of TBs. In some other embodiments, the first TDRA pattern may indicate a third number of PUSCHs carrying the first number of TBs scheduled by the DCI format. In some cases, the plurality of TDRA patterns may be predefined. In some cases, the BS may transmit a RRC signaling message to the UE to indicate the plurality of TDRA patterns. The TDRA pattern list as described above with respect to signaling scheme A may apply here as the plurality of TDRA patterns.

In some embodiments of the present disclosure, signaling scheme B is applied to the exemplary procedure 700.

For example, the DCI format may indicate the first number of TBs. In some cases, the maximum number of TBs scheduled by a DCI format may be predefined. In some cases, the BS may transmit a RRC signaling message to the UE to indicate the maximum number of TBs scheduled by a DCI format. In some other examples, the DCI format may indicate a third number of PUSCHs carrying the first number of TBs scheduled by the DCI format. In some cases, the maximum number of PUSCHs scheduled by a DCI format may be predefined. In some cases, the BS may transmit a RRC signaling message to the UE to indicate the maximum number of PUSCHs scheduled by a DCI format.

In some embodiments, the DCI format may further indicate the value of the second number or the value of the second number minus 2 (e.g., the number of middle slots). The BS may transmit a RRC signaling message to the UE to indicate the maximum number of slots assigned by a DCI format. The DCI format may further indicate a start symbol of a first slot of the second number of slots and the number of consecutive symbols of the last slot of the second number of slots.

In some other embodiments, the DCI format indicates a specific TDRA pattern (hereinafter, "first TDRA pattern") of a plurality of TDRA patterns. In some cases, the plurality of TDRA patterns may be predefined. In some cases, the BS may transmit a RRC signaling message to the UE to indicate the plurality of TDRA patterns. The TDRA pattern list as described above with respect to signaling scheme B may apply here as the plurality of TDRA patterns. Thus, details regarding the plurality of TDRA patterns are omitted herein.

The BS may then determine the mapping relationship between scheduled TBs (or PUSCHs) and the number of assigned slots according to the mapping methods described above with respect to signaling scheme A and signaling scheme B.

In some embodiments of the present disclosure, the DCI format may include a field indicating whether each of the first number of TBs is new data or not, and the number of the bits of the field is equal to the maximum number of TBs scheduled by the DCI format.

In some embodiments of the present disclosure, the DCI format may include a field indicating a redundancy version for each of the first number of TBs, and the number of the bits of the field is equal to the maximum number of TBs scheduled by the DCI format.

In some embodiments of the present disclosure, the DCI format may only schedule one PUSCH carrying the first number of TBs and occupying the second number of slots. The DCI format may indicate a start symbol of the PUSCH in a first slot of the second number of slots and the number of consecutive symbols of the PUSCH in the last slot of the second number of slots and the second number of slots.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
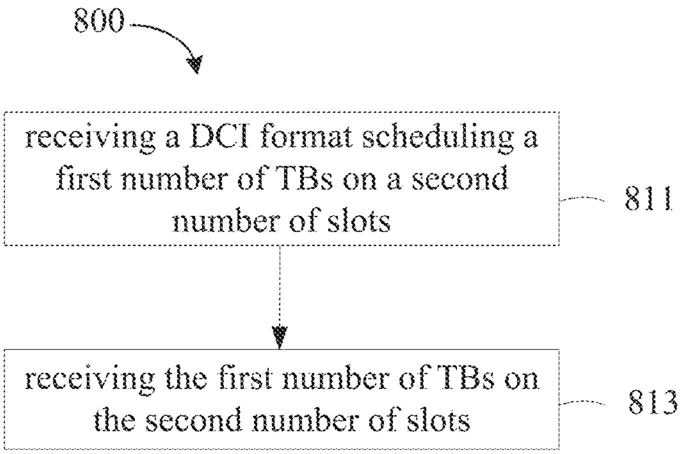
FIG. 8 illustrates a flow chart of an exemplary procedure of wireless communications in accordance with some embodiments of the present disclosure.

FIG. 8 illustrates a flow chart of an exemplary procedure 800 for wireless communications in accordance with some embodiments of the present disclosure. Details described in all of the foregoing embodiments of the present disclosure are applicable for the embodiments shown in FIG. 8. The procedure may be performed by a UE, for example, UE 101 in FIG. 1.

Referring to FIG. 8, in operation 811, a UE may receive a DCI format scheduling a first number of TBs on a second number of slots from a BS. The second number of slots is consecutive in time domain without any gaps. The DCI format may schedule at least one PDSCH for carrying the first number of TBs. In some embodiments of the present disclosure, the UE may receive a RRC signaling message indicating the maximum number of TBs carried by a PDSCH. For example, the maximum number of TBs carried by a PDSCH may be one, two, or other positive integers.

In operation 813, the UE may receive the first number of TBs on the second number of slots. Signaling scheme A or signaling scheme B may be applied to the exemplary procedure 800. As a principle, approximately an equal number of slots of the second number of slots is allocated to each of the first number of TBs. For example, the difference in the number of slots allocated to each of the first number of TBs may be less than or equal to a certain number, for example, one.

In some embodiments of the present disclosure, signaling scheme A is applied to the exemplary procedure 800.

For example, the DCI format may indicate a specific TDRA pattern (hereinafter, "first TDRA pattern") of a plurality of TDRA patterns. In some embodiments, the first TDRA pattern may indicate the first number of TBs. In some other embodiments, the first TDRA pattern may indicate a third number of PDSCHs carrying the first number of TBs scheduled by the DCI format. The plurality of TDRA patterns may be configured by a RRC signaling message or predefined. The TDRA pattern list as described above with respect to signaling scheme A may apply here as the plurality of TDRA patterns.

In some embodiments of the present disclosure, signaling scheme B is applied to the exemplary procedure 700. For example, the DCI format may indicate the first number of TBs. The maximum number of TBs scheduled by a DCI format may be configured by a RRC signaling message or predefined. In some other examples, the DCI format may indicate a third number of PDSCHs carrying the first number of TBs scheduled by the DCI format. The maximum number of PDSCHs scheduled by a DCI format may be configured by a RRC signaling message or predefined.

In some embodiments, the DCI format may further indicate the value of the second number or the value of the second number minus 2 (e.g., the number of middle slots). The maximum number of slots assigned by the DCI format may be configured by a RRC signaling message. The DCI format may further indicate a start symbol of a first slot of the second number of slots and the number of consecutive symbols of the last slot of the second number of slots.

In some other embodiments, the DCI format indicates a specific TDRA pattern (hereinafter, "first TDRA pattern") of a plurality of TDRA patterns. The plurality of TDRA patterns may be configured by a RRC signaling message or predefined. The TDRA pattern list as described above with respect to signaling scheme B may apply here as the plurality of TDRA patterns.

For example, in both signaling scheme A and signaling scheme B, the first TDRA pattern may indicate at least one SLIV indicating a start symbol and the number of consecutive symbols in a slot, wherein each SLIV of the at least one SLIV is associated with a PDSCH carrying a TB and does not go across a slot boundary. The second number of slots may be based on the at least one SLIV.

In some other examples, in both signaling scheme A and signaling scheme B, the first TDRA pattern may indicate the second number of slots, and a SLIV for indicating a start symbol of a first slot of the second number of slots and the number of consecutive symbols of the last slot of the second number of slots. In these examples, the end symbol for the scheduled transmission in the first slot of the second number of slots is the last symbol (e.g., symbol 13) of the first slot, and the start symbol for the scheduled transmission in the last slot of the assigned slots is the first symbol (e.g., symbol 0) of the last slot. The middle slots of the second number of slots (i.e., the slots excluding the first and last slots) are fully used. For example, referring to FIG. 4, the SLIV may indicate a start symbol 415 index of slot n and the number of consecutive symbols 417 in slot n+7.

In yet other examples, in both signaling scheme A and signaling scheme B, the first TDRA pattern may indicate the second number of slots and a start symbol of a first slot of the second number of slots. The start symbol is applied to the first slot of the second number of slots. That is, the scheduled transmission in the first slot of the second number of slots starts from the indicated start symbol. The end symbol for the scheduled transmission in all the second number of slots is the last symbol (e.g., symbol 13) of the corresponding slot, and the start symbol for the scheduled transmission in the second to the last slots of the second number of slots is the first symbol (e.g., symbol 0) of the corresponding slot.

In yet other examples, in both signaling scheme A and signaling scheme B, the first TDRA pattern may indicate a total number of symbols in the second number of slots and a start symbol of a first slot of the second number of slots. The start symbol field is applied to the first slot of the second number of slots. That is, the scheduled transmission in the first slot of the second number of slots starts from the indicated start symbol. The end symbol for the scheduled transmission in all the second number of slots is the last symbol of the corresponding slot (e.g., symbol 13), and the start symbol for the scheduled transmission in the second to the last slots of the second number of slots is the first symbol of the corresponding slot (e.g., symbol 0). The second number of slots may be based on the total number of symbols. For example, the total number of symbols may be counted from the indicated start symbol.

In yet other examples, in both signaling scheme A and signaling scheme B, the first TDRA pattern may indicate at least one SLIV indicating a start symbol and the number of consecutive symbols in a slot. Each SLIV of the at least one SLIV may be associated with a PDSCH carrying a TB and can go across a slot boundary. The second number of slots may be based on the at least one SLIV.

In both signaling scheme A and signaling scheme B, the first TDRA pattern may indicate one or more of the following: a slot level offset between the DCI format and a first slot of the second number of slots (or a first PDSCH); and at least one mapping type. The descriptions of the mapping type described above may apply here.

The UE may then establish the mapping relationship between scheduled TBs (or PDSCHs) and the number of assigned slots according to the mapping methods described above with respect to signaling scheme A and signaling scheme B.

For example, when the first TDRA pattern or the DCI format indicates the number of TBs and the maximum number of TBs carried by a PDSCH is one (e.g., configured by a RRC signaling message), the UE may determine that each of the first x TBs of the first number of TBs occupies $y_1$ slots of the second number of slots and each of the remaining N−x TBs of the first number of TBs occupies $y_2$ slots of the second number of slots, wherein x=mod(M,N), $$y_1 = \left\lceil \frac{M}{N} \right\rceil,\ y_2 = \left\lfloor \frac{M}{N} \right\rfloor,$$

M denotes a value of the second number, and N denotes a value of the first number.

In some other examples, when the first TDRA pattern or the DCI format indicates the number of TBs and the maximum number of TBs carried by a PDSCH is two (e.g., configured by a RRC signaling message), the UE may determine that each of the first x PDSCHs corresponds to $y_1$ slots, and each of the remaining N'−x PDSCHs corresponds to $y_2$ slots, wherein x=mod(M,N'), $$y_1 = \left\lceil \frac{M}{N'} \right\rceil,\ y_2 = \left\lfloor \frac{M}{N'} \right\rfloor,\ N' = \left\lceil \frac{N}{2} \right\rceil,$$

M denotes a value of the second number, N denotes a value of the first number, and N' denotes the number of scheduled PDSCHs.

In yet other examples, when the first TDRA pattern or the DCI format indicates the number of scheduled PDSCHs, the UE may determine that each of the first x PDSCHs corresponds to $y_1$ slots, and each of the remaining N'−x PDSCHs corresponds to $y_2$ slots, wherein x=mod(M,N'), $$y_1 = \left\lceil \frac{M}{N'} \right\rceil, y_2 = \left\lfloor \frac{M}{N'} \right\rfloor,$$

M denotes a value of the second number, and N' denotes a value of the third number.

In yet other examples, each entry of the TDRA pattern list may include a one-bit field indicating either one TB occupying all assigned slots or a one to one TB to slot mapping.

In some embodiments of the present disclosure, the DCI format may include a field indicating whether each of the first number of TBs is new data or not, and the number of the bits of the field is equal to the maximum number of TBs scheduled by the DCI format.

In some embodiments of the present disclosure, the DCI format may include a field indicating a redundancy version for each of the first number of TBs, and the number of the bits of the field is equal to the maximum number of TBs scheduled by the DCI format.

In some embodiments of the present disclosure, the DCI format may only schedule one PDSCH carrying the first number of TBs and occupying the second number of slots. The DCI format may indicate a start symbol of the PDSCH in a first slot of the second number of slots and the number of consecutive symbols of the PDSCH in the last slot of the second number of slots and the second number of slots.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
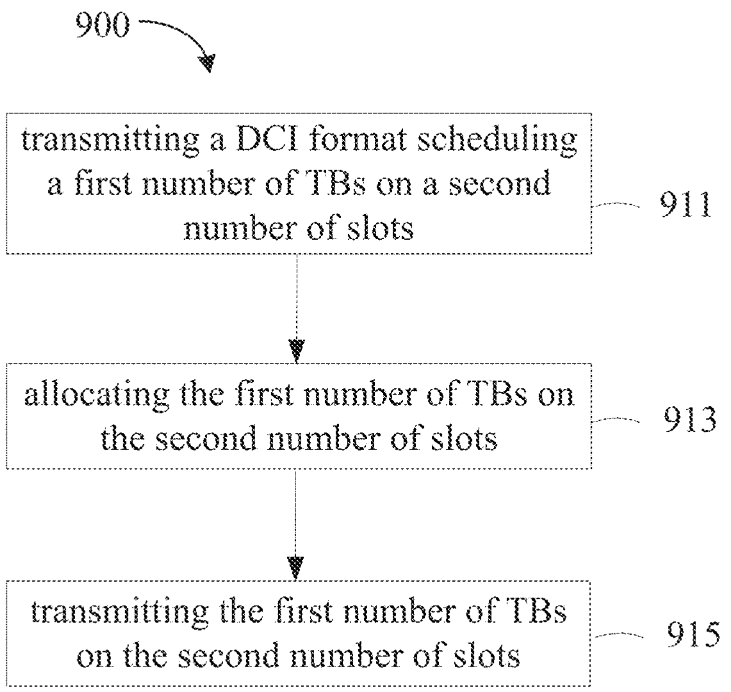
FIG. 9 illustrates a flow chart of an exemplary procedure of wireless communications in accordance with some embodiments of the present disclosure.

FIG. 9 illustrates a flow chart of an exemplary procedure 900 for wireless communications in accordance with some embodiments of the present disclosure. Details described in all of the foregoing embodiments of the present disclosure are applicable for the embodiments shown in FIG. 9. The procedure may be performed by a BS, for example, BS 102 in FIG. 1.

Referring to FIG. 9, in operation 911, a BS may transmit a DCI format scheduling a first number of TBs on a second number of slots to a UE. The second number of slots is consecutive in time domain without any gaps. The DCI format may schedule at least one PDSCH for carrying the first number of TBs. In some embodiments of the present disclosure, the BS may transmit a RRC signaling message indicating the maximum number of TBs carried by a PDSCH. For example, the maximum number of TBs carried by a PDSCH may be one, two, or other positive integers.

In operation 913, the BS may allocate the first number of TBs on the second number of slots. The BS may allocate the TBs according to the method as described with respect to signaling scheme A and signaling scheme B. As a principle, approximately an equal number of slots of the second number of slots is allocated to each of the first number of TBs. For example, the difference in the number of slots allocated to each of the first number of TBs may be less than or equal to a certain number, for example, one.

In some embodiments of the present disclosure, signaling scheme A is applied to the exemplary procedure 900.

For example, the DCI format may indicate a specific TDRA pattern (hereinafter, "first TDRA pattern") of a plurality of TDRA patterns. In some embodiments, the first TDRA pattern may indicate the first number of TBs. In some other embodiments, the first TDRA pattern may indicate a third number of PDSCHs carrying the first number of TBs scheduled by the DCI format. In some cases, the plurality of TDRA patterns may be predefined. In some cases, the BS may transmit a RRC signaling message to the UE to indicate the plurality of TDRA patterns. The TDRA pattern list as described above with respect to signaling scheme A may apply here as the plurality of TDRA patterns.

In some embodiments of the present disclosure, signaling scheme B is applied to the exemplary procedure 900.

For example, the DCI format may indicate the first number of TBs. In some cases, the maximum number of TBs scheduled by a DCI format may be predefined. In some cases, the BS may transmit a RRC signaling message to the UE to indicate the maximum number of TBs scheduled by a DCI format. In some other examples, the DCI format may indicate a third number of PDSCHs carrying the first number of TBs scheduled by the DCI format. In some cases, the maximum number of PDSCHs scheduled by a DCI format may be predefined. In some cases, the BS may transmit a RRC signaling message to the UE to indicate the maximum number of PDSCHs scheduled by a DCI format.

In some embodiments, the DCI format may further indicate the value of the second number or the value of the second number minus 2 (e.g., the number of middle slots). The BS may transmit a RRC signaling message to the UE to indicate the maximum number of slots assigned by a DCI format. The DCI format may further indicate a start symbol of a first slot of the second number of slots and the number of consecutive symbols of the last slot of the second number of slots.

In some other embodiments, the DCI format indicates a specific TDRA pattern (hereinafter, "first TDRA pattern") of a plurality of TDRA patterns. In some cases, the plurality of TDRA patterns may be predefined. In some cases, the BS may transmit a RRC signaling message to the UE to indicate the plurality of TDRA patterns. The TDRA pattern list as described above with respect to signaling scheme B may apply here as the plurality of TDRA patterns. Thus, details regarding the plurality of TDRA patterns are omitted herein.

The BS may then determine the mapping relationship between scheduled TBs (or PDSCHs) and the number of assigned slots according to the mapping methods described above with respect to signaling scheme A and signaling scheme B.

In some embodiments of the present disclosure, the DCI format may include a field indicating whether each of the first number of TBs is new data or not, and the number of the bits of the field is equal to the maximum number of TBs scheduled by the DCI format.

In some embodiments of the present disclosure, the DCI format may include a field indicating a redundancy version for each of the first number of TBs, and the number of the bits of the field is equal to the maximum number of TBs scheduled by the DCI format.

In some embodiments of the present disclosure, the DCI format may only schedule one PDSCH carrying the first number of TBs and occupying the second number of slots. The DCI format may indicate a start symbol of the PDSCH in a first slot of the second number of slots and the number of consecutive symbols of the PDSCH in the last slot of the second number of slots and the second number of slots.

In operation 915, the BS may transmit the first number of TBs on the second number of slots to the UE.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
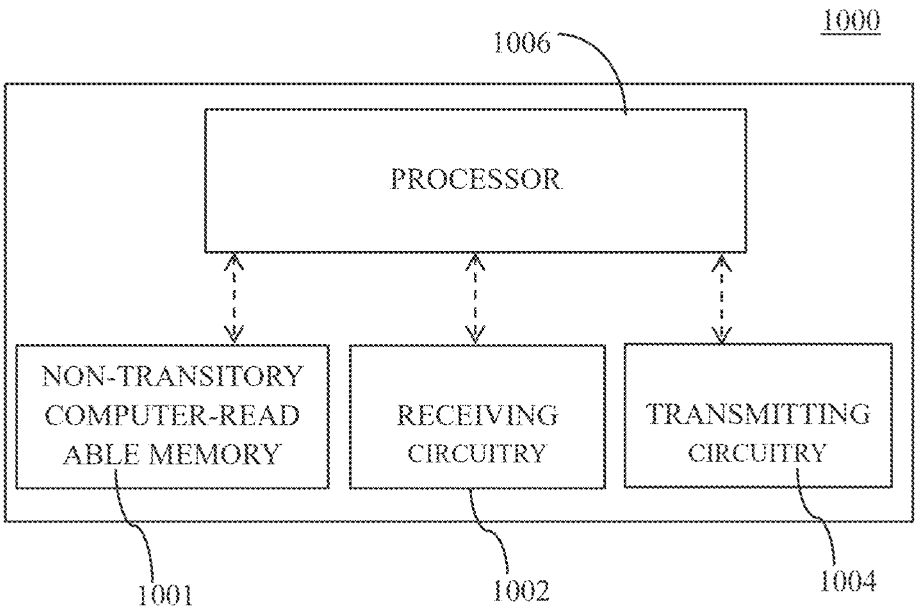
FIG. 10 illustrates a block diagram of an exemplary apparatus in accordance with some embodiments of the present disclosure.

FIG. 10 illustrates a block diagram of an exemplary apparatus 1000 according to some embodiments of the present disclosure.

As shown in FIG. 10, the apparatus 1000 may include at least one non-transitory computer-readable medium 1001, at least one receiving circuitry 1002, at least one transmitting circuitry 1004, and at least one processor 1006 coupled to the non-transitory computer-readable medium 1001, the receiving circuitry 1002 and the transmitting circuitry 1004. The apparatus 1000 may be a base station side apparatus (e.g., a BS) or a communication device (e.g., a UE).

Although in this figure, elements such as the at least one processor 1006, transmitting circuitry 1004, and receiving circuitry 1002 are described in the singular, the plural is contemplated unless a limitation to the singular is explicitly stated. In some embodiments of the present application, the receiving circuitry 1002 and the transmitting circuitry 1004 are combined into a single device, such as a transceiver. In certain embodiments of the present application, the apparatus 1000 may further include an input device, a memory, and/or other components.

In some embodiments of the present disclosure, the non-transitory computer-readable medium 1001 may have stored thereon computer-executable instructions to cause a processor to implement the method with respect to the UEs as described above. For example, the computer-executable instructions, when executed, cause the processor 1006 interacting with receiving circuitry 1002 and transmitting circuitry 1004, so as to perform the operations with respect to the UEs described in FIGS. 1-6 and 8.

In some embodiments of the present disclosure, the non-transitory computer-readable medium 1001 may have stored thereon computer-executable instructions to cause a processor to implement the method with respect to the BSs as described above. For example, the computer-executable instructions, when executed, cause the processor 1006 interacting with receiving circuitry 1002 and transmitting circuitry 1004, so as to perform the operations with respect to the BSs described in FIGS. 1-5, 7, and 9.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." The wording "the first," "the second" or the like are only used to clearly illustrate the embodiments of the present application, but are not used to limit the substance of the present application.

What is claimed:

1. A user equipment (UE) for wireless communication, comprising:

at least one memory; and at least one processor coupled with the at least one memory and operable to cause the UE to:

receive a downlink control information (DCI) format scheduling a first number of transport blocks (TBs) on a second number of slots, wherein the second number of slots is consecutive in time domain without gaps, and wherein at least one of:

the DCI format comprises a field indicating whether each of a first number of TBs is new data or not, and a number of bits of the field is equal to a maximum number of TBs scheduled by the DCI format;

the DCI format comprises a field indicating a redundancy version for each of the first number of TBs, and the number of bits of the field is equal to the maximum number of TBs scheduled by the DCI format; or the DCI format schedules one physical uplink shared channel (PUSCH) carrying the first number of TBs and occupying the second number of slots, and the DCI format indicates a start symbol of the PUSCH in a first slot of the second number of slots and a number of consecutive symbols of the PUSCH in a last slot of the second number of slots and the second number of slots;

allocate the first number of TBs on the second number of slots, wherein approximately an equal number of slots of the second number of slots is allocated to each of the first number of TBs; and transmit the first number of TBs on the second number of slots.

2. The UE of claim 1, wherein at least one of:

a difference in the number of slots allocated to each of the first number of TBs is less than or equal to one;

the at least one processor is configured to cause the UE to receive a radio resource control (RRC) signaling indicating a maximum number of TBs carried by a physical uplink shared channel (PUSCH); or the DCI format indicates a first time domain resource allocation (TDRA) pattern of a plurality of TDRA patterns.

3. The UE of claim 2, wherein the first TDRA pattern indicates one or more of the first number of TBs or a third number of physical uplink shared channels (PUSCHs) carrying the first number of TBs scheduled by the DCI format.

4. The UE of claim 1, wherein the DCI format indicates the first number of TBs, and a maximum number of TBs scheduled by a DCI format is configured by a radio resource control (RRC) signaling or predefined.

5. The UE of claim 1, wherein at least one of:

the DCI format indicates a third number of physical uplink shared channels (PUSCHs) carrying the first number of TBs scheduled by the DCI format;

a maximum number of PUSCHs scheduled by a DCI format is configured by a radio resource control (RRC) signaling or predefined;

the DCI format indicates a value of the second number or the value of the second number minus 2;

a maximum number of slots assigned by the DCI format is configured by a radio resource control (RRC) signaling; or the DCI format indicates a start symbol of a first slot of the second number of slots and a number of consecutive symbols of a last slot of the second number of slots.

6. The UE of claim 4, wherein the DCI format indicates a first time domain resource allocation (TDRA) pattern of a plurality of TDRA patterns.

7. The UE of claim 1, wherein at least one of:

the DCI format indicates a first time domain resource allocation (TDRA) pattern of a plurality of TDRA patterns;

the plurality of TDRA patterns are configured by a radio resource control (RRC) signaling or predefined;

the first TDRA pattern indicates at least one start and length indicator value (SLIV) indicating a start symbol and a number of consecutive symbols in a slot, wherein each SLIV of the at least one SLIV is associated with a physical uplink shared channel (PUSCH) carrying a TB and does not go across a slot boundary, and wherein the second number of slots is based on the at least one SLIV;

the first TDRA pattern indicates the second number of slots, and a start and length indicator value (SLIV) for indicating a start symbol of a first slot of the second number of slots and the number of consecutive symbols of a last slot of the second number of slots;

the first TDRA pattern indicates the second number of slots and a start symbol of a first slot of the second number of slots;

the first TDRA pattern indicates a total number of symbols in the second number of slots and a start symbol of a first slot of the second number of slots; and the second number of slots is based on the total number of symbols;

the first TDRA pattern indicates at least one start and length indicator value (SLIV) indicating a start symbol and the number of consecutive symbols in a slot, wherein each SLIV of the at least one SLIV is associated with a physical uplink shared channel (PUSCH) carrying a TB and can go across a slot boundary, and the second number of slots is based on the at least one SLIV; or first TDRA pattern indicates one or more of:

a slot level offset between the DCI format and a first slot of the second number of slots; and at least one mapping type.

8. The UE of claim 3, wherein one of:

the maximum number of TBs carried by a physical uplink shared channel (PUSCH) is one, and the at least one processor is configured to cause the UE to determine that each of a first x TBs of a first number of TBs occupies $y_1$ slots of the second number of slots and each of remaining N−x TBs of the first number of TBs occupies $y_2$ slots of the second number of slots, wherein, x=mod(M,N), $$y_1 = \left\lceil \frac{M}{N} \right\rceil, y_2 = \left\lfloor \frac{M}{N} \right\rfloor$$

M denotes a value of the second number, and N denotes a value of the first number; or the maximum number of TBs carried by a physical uplink shared channel (PUSCH) is two, and the at least one processor is configured to cause the UE to determine that each of the first x PUSCHs corresponds to $y_1$ slots, and each of remaining N'−x PUSCHs corresponds to $y_2$ slots, wherein, x=mod(M, N'), $$y_2 = \left\lfloor \frac{M}{N'} \right\rfloor, N' = \left\lceil \frac{N}{2} \right\rceil$$

M denotes a value of the second number, N denotes a value of the first number, and N' denotes the number of scheduled PUSCHs.

9. The UE of claim 5, wherein the at least one processor is configured to cause the UE to:

determine that each of a first x PUSCHs corresponds to $y_1$ slots, and each of remaining N'−x PUSCHs corresponds to $y_2$ slots;

wherein, x=mod(M,N'), $$y_1 = \left\lceil \frac{M}{N'} \right\rceil, y_2 = \left\lfloor \frac{M}{N'} \right\rfloor$$

M denotes a value of the second number, and N' denotes a value of the third number.

10. A user equipment (UE) for wireless communication, comprising:

at least one memory; and at least one processor coupled with the at least one memory and operable to cause the UE to:

receive a downlink control information (DCI) format scheduling a first number of transport blocks (TBs) on a second number of slots, wherein the second number of slots is consecutive in time domain without gaps, and wherein at least one of:

the DCI format comprises a field indicating whether each of a first number of TBs is new data or not, and a number of bits of the field is equal to a maximum number of TBs scheduled by the DCI format;

the DCI format comprises a field indicating a redundancy version for each of the first number of TBs, and the number of bits of the field is equal to the maximum number of TBs scheduled by the DCI format; or the DCI format schedules one physical uplink shared channel (PUSCH) carrying the first number of TBs and occupying the second number of slots, and the DCI format indicates a start symbol of the PUSCH in a first slot of the second number of slots and a number of consecutive symbols of the PUSCH in a last slot of the second number of slots and the second number of slots; and receive the first number of TBs on the second number of slots, wherein approximately an equal number of slots of the second number of slots is allocated to each of the first number of TBs.

11. The UE of claim 10, wherein at least one of:

a difference in the number of slots allocated to each of the first number of TBs is less than or equal to one;

the at least one processor is configured to cause the UE to receive a radio resource control (RRC) signaling indicating a maximum number of TBs carried by a physical downlink shared channel (PDSCH);

the DCI format indicates a first time domain resource allocation (TDRA) pattern of a plurality of TDRA patterns;

the first TDRA pattern indicates the first number of TBs; or the first TDRA pattern indicates a third number of physical downlink shared channels (PDSCHs) carrying the first number of TBs scheduled by the DCI format.

12. The UE of claim 10, wherein the DCI format indicates the first number of TBs, and wherein a maximum number of TBs scheduled by a DCI format is configured by a radio resource control (RRC) signaling or predefined.

13. The UE of claim 10, wherein at least one of:
- the DCI format indicates a third number of physical downlink shared channels (PDSCHs) carrying the first number of TBs scheduled by the DCI format;
- a maximum number of PDSCHs scheduled by a DCI format is configured by a radio resource control (RRC) signaling or predefined;
- the DCI format indicates a value of the second number or the value of the second number minus 2;
- a maximum number of slots assigned by the DCI format is configured by a radio resource control (RRC) signaling; or
- the DCI format indicates a start symbol of a first slot of a second number of slots and a number of consecutive symbols of a last slot of the second number of slots.

14. The UE of claim 12, wherein the DCI format indicates a first time domain resource allocation (TDRA) pattern of a plurality of TDRA patterns.

15. The UE of claim 13, wherein at least one of:
- the DCI format indicates a first time domain resource allocation (TDRA) pattern of a plurality of TDRA patterns;
- the plurality of TDRA patterns are configured by a radio resource control (RRC) signaling or predefined;
- the first TDRA pattern indicates at least one start and length indicator value (SLIV) indicating a start symbol and the number of consecutive symbols in a slot, wherein each SLIV of the at least one SLIV is associated with a physical downlink shared channel (PDSCH) carrying a TB and does not go across a slot boundary, and the second number of slots is based on the at least one SLIV;
- the first TDRA pattern indicates the second number of slots, and a start and length indicator value (SLIV) for indicating a start symbol of a first slot of the second number of slots and the number of consecutive symbols of the last slot of the second number of slots;
- the first TDRA pattern indicates the second number of slots and a start symbol of a first slot of the second number of slots;
- the first TDRA pattern indicates a total number of symbols in the second number of slots and a start symbol of a first slot of the second number of slots, and the second number of slots is based on the total number of symbols;
- the first TDRA pattern indicates at least one start and length indicator value (SLIV) indicating a start symbol and the number of consecutive symbols in a slot, wherein each SLIV of the at least one SLIV is associated with a physical downlink shared channel (PDSCH) carrying a TB and can go across a slot boundary, and the second number of slots is based on the at least one SLIV; or
- the first TDRA pattern indicates one or more of a slot level offset between the DCI format and a first slot of the second number of slots, or at least one mapping type.

16. The UE of claim 12, wherein one of:
- the maximum number of TBs carried by a physical downlink shared channel (PDSCH) is one, and the at least one processor is configured to cause the UE to determine that each of the first x TBs of the first number of TBs occupies $y_1$ slots of the second number of slots and each of remaining N−x TBs of the first number of TBs occupies $y_2$ slots of the second number of slots, wherein, x=mod(M,N), $$y_1 = \left\lceil \frac{M}{N'} \right\rceil, y_2 = \left\lfloor \frac{M}{N'} \right\rfloor$$

M denotes a value of the second number, and N denotes a value of the first number; or
- the maximum number of TBs carried by a physical downlink shared channel (PDSCH) is two, and the at least one processor is configured to cause the UE to determine that each of the first x PDSCHs corresponds to $y_1$ slots, and each of remaining N'−x PDSCHs corresponds to $y_2$ slots, wherein, x=mod(M,N'), $$y_1 = \left\lceil \frac{M}{N'} \right\rceil, y_2 = \left\lfloor \frac{M}{N'} \right\rfloor, N' = \left\lceil \frac{N}{2} \right\rceil$$

M denotes a value of the second number, N denotes a value of the first number, and N' denotes a number of scheduled PDSCHs.

17. The UE of claim 13, wherein the at least one processor is configured to cause the UE to:
- determine that each of a first x PDSCHs corresponds to $y_1$ slots, and each of a remaining N'−x PDSCHs corresponds to $y_2$ slots;
- wherein, x=mod(M,N'), $$y_1 = \left\lceil \frac{M}{N'} \right\rceil, y_2 = \left\lfloor \frac{M}{N'} \right\rfloor$$

M denotes a value of the second number, and N' denotes the value of the third number.

18. A method performed by a user equipment (UE) the method comprising:
- receiving a downlink control information (DCI) format scheduling a first number of transport blocks (TBs) on a second number of slots, wherein the second number of slots is consecutive in time domain without gaps, and wherein at least one of:
  - the DCI format comprises a field indicating whether each of a first number of TBs is new data or not, and a number of bits of the field is equal to a maximum number of TBs scheduled by the DCI format;
  - the DCI format comprises a field indicating a redundancy version for each of the first number of TBs, and the number of bits of the field is equal to the maximum number of TBs scheduled by the DCI format; or
  - the DCI format schedules one physical uplink shared channel (PUSCH) carrying the first number of TBs and occupying the second number of slots, and the DCI format indicates a start symbol of the PUSCH in a first slot of the second number of slots and a number of consecutive symbols of the PUSCH in a last slot of the second number of slots and the second number of slots;
- allocating the first number of TBs on the second number of slots, wherein approximately an equal number of slots of the second number of slots is allocated to each of the first number of TBs; and
- transmitting the first number of TBs on the second number of slots.

19. The method of claim 18, wherein at least one of:
- a difference in the number of slots allocated to each of the first number of TBs is less than or equal to one;
- the method further comprises receiving a radio resource control (RRC) signaling indicating a maximum number of TBs carried by a physical uplink shared channel (PUSCH); or the DCI format indicates a first time domain resource allocation (TDRA) pattern of a plurality of TDRA patterns.

20. The method of claim 19, wherein the first TDRA pattern indicates one or more of the first number of TBs or a third number of physical uplink shared channels (PUSCHs) carrying the first number of TBs scheduled by the DCI format.

* * * * *